United States Patent
Niwa et al.

(10) Patent No.: US 6,609,817 B2
(45) Date of Patent: Aug. 26, 2003

(54) LIGHT DISTRIBUTION CONTROL APPARATUS

(75) Inventors: Toshiaki Niwa, Okazaki (JP);
Toshihiro Shimado, Okazaki (JP);
Shoji Kobayashi, Shimizu (JP);
Kazuhiro Suzuki, Shimizu (JP)

(73) Assignees: Aisin AW Co., Ltd., Anjo (JP); Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/026,875

(22) Filed: Dec. 27, 2001

(65) Prior Publication Data

US 2002/0080617 A1 Jun. 27, 2002

(30) Foreign Application Priority Data

Dec. 27, 2000 (JP) .......................................... 2000-398681
Jul. 31, 2001 (JP) .......................................... 2001-232715

(51) Int. Cl.$^7$ ............................................... B60Q 1/02
(52) U.S. Cl. ........................ 362/466; 362/465; 362/467
(58) Field of Search ................................ 362/465, 466, 362/467; 701/36, 49, 208, 210, 211; 340/575, 576, 905, 995; 307/9.1, 10.1

(56) References Cited

U.S. PATENT DOCUMENTS

| | | | | |
|---|---|---|---|---|
| 5,422,639 A | * | 6/1995 | Kobayashi et al. | 340/988 |
| 5,552,990 A | * | 9/1996 | Ihara et al. | 701/208 |
| 5,570,087 A | * | 10/1996 | Lemelson | 340/870.05 |
| 6,049,749 A | * | 4/2000 | Kobayashi | 701/49 |
| 6,459,961 B1 | * | 10/2002 | Obradovich et al. | 701/1 |
| 6,481,876 B2 | * | 11/2002 | Hayami et al. | 362/464 |

FOREIGN PATENT DOCUMENTS

JP    A 2-296550    12/1990

* cited by examiner

*Primary Examiner*—Sandra O'Shea
*Assistant Examiner*—John Amarantides
(74) *Attorney, Agent, or Firm*—Oliff & Berridge, PLC

(57) ABSTRACT

A light distribution control apparatus which is less affected by an error in a navigation function, and conducts a proper light distribution. An illuminated area and a glare quantity are controlled according to a determination on a traveling region of a vehicle (an expressway, a general road, or an urban region), and an illuminating direction is controlled according to a determination on a road shape. On the other hand, a navigation processor determines reliabilities of current position detection, and a vehicle position based on road data, and determines a reliability of the road shape and a reliability of the traveling region. A base illuminated area and a medium glare are selected when the reliability of the traveling region is low, an illuminated area according to the traveling region is selected and the glare quantity is decreased when the reliability is medium, and an illuminated area and a glare quantity according to the traveling region are selected when the reliability is high. A light distribution angle θ hs according to a steering angle is selected when the reliability of the road shape is low, and a light distribution angle θ hn for illuminating a vehicle position after T seconds is selected when the reliability is high.

19 Claims, 13 Drawing Sheets

Reliability determining table 123

| | Item | YES |
|---|---|---|
| GPS | - Receive radio waves from four or more satellites, and travel a predetermined distance while positioning in 3D. | 1 |
| | - Receive radio waves from four or more satellites, and travel for a predetermined period while positioning in 3D. | 1 |
| | - Receives D -GPS information. | 2 |
| | ⋮ | ⋮ |
| Gyro | - The output voltage stays in a predetermined range for more than a predetermined period when stopping (vehicle speed: 0 km/h). | 2 |
| | - A center correction is applied to a detected angular velocity with an output voltage when stopping (vehicle speed: 0 km/h) as a reference relative direction. | 2 |
| | - A passed time is within a predetermined period after a center correction. | 1 |
| | ⋮ | ⋮ |
| Distance sensor | - A traveling distance is within a predetermined value after a distance coefficient correction. | 1 |
| | - The vehicle speed is a predetermined value or less. | 1 |
| | - A value after the distance coefficient correction stays within a predetermined range for predetermined consecutive times. | 1 |
| | - A difference between a current value after the distance coefficient correction and a previous value is a predetermined value or more. | -2 |
| | ⋮ | ⋮ |
| Map matching | - Travel a predetermined distance after a departure from a route. | -2 |
| | - Travel for a predetermined period after a departure from a route. | -2 |
| | - A bent determination or the like is conducted at an intersection, a branch point, or a corner to correct an estimated current position according to a road shape after a departure from a route. | 4 |
| | - The number of position candidates for current position estimation is more than a predetermined value. | -1 |
| | - A difference between correlation values of position candidates for the current position estimation is more than a predetermined value. | 1 |
| | - A difference between a traveling distance of an estimated current position and a traveling distance converted from the vehicle speed is within a predetermined value. | 1 |
| | - There is a road parallel to a road on which the vehicle is traveling. | -1 |
| | | |
| ⋮ | ⋮ | ⋮ |

Fig. 2

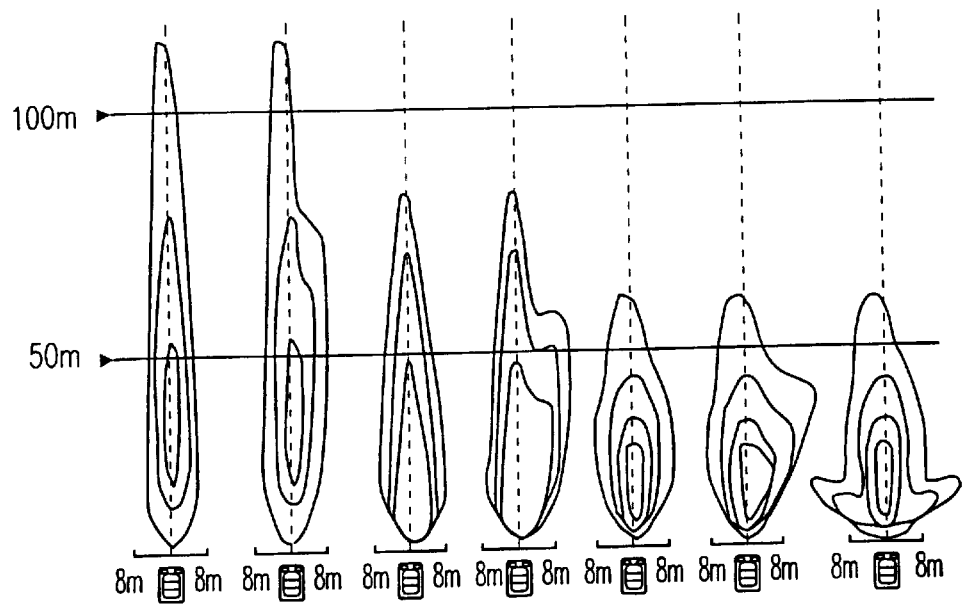

| Light distribution pattern number | 2 | | 0 | | 1 | | 3 |
|---|---|---|---|---|---|---|---|
| Road shape | Straight | Curved | Straight | Curved | Straight | Curved | Intersection |
| Traveling region | Expressway traveling | | General road traveling | | Urban region traveling | | |
| Glare | High glare | | Medium glare | | Low glare | | |
| Lighting A | H beam | H beam | L beam | L beam | L beam | L beam | L beam |
| Lighting B | Front | Left/Right | Front | Left/Right | Front | Left/Right | Front |
| Lighting C | OFF | OFF | OFF | OFF | OFF | OFF | ON |
| Lighting D | ON (Up) | ON (Up) | ON (Down) | ON (Down) | OFF | OFF | OFF |

Fig. 6

Setting example of road map data reliability ratio ε with respect to road class (type class) property and region/district

| Region property | Reliability ratio | Road class property | | | | | |
|---|---|---|---|---|---|---|---|
| | | Four-lane expressway | Four-lane main national road / Two-lane expressway | Two-lane national road / Four-lane main prefectural road | Two-lane prefectural road | City road | Domestic road |
| Commercial/industrial region | 1.0 | 1.0 | 1.0 | 1.0 | 0.8 | 0.6 | 0.2 |
| Urban region | 0.9 | 1.0 | 1.0 | 1.0 | 0.8 | 0.6 | 0.2 |
| Non-urban region | 0.8 | 0.9 | 0.9 | 0.9 | 0.7 | 0.5 | 0.2 |
| Underpopulated/mountain region | 0.6 | 0.8 | 0.8 | 0.8 | 0.6 | 0.5 | 0.2 |
| | | 0.6 | 0.6 | 0.6 | 0.5 | 0.4 | 0.1 |

Fig. 13

Setting example of road map data reliability ratio ε with respect to road class (type class) property and altitude H

| Region property (altitude) | Road class property | | | | |
|---|---|---|---|---|---|
| | Four-lane expressway | Four-lane main national road / Two-lane expressway | Two-lane national road / Four-lane main prefectural road | Two-lane prefectural road | City road | Domestic road |
| 0≦H<50 | 1.0 | 1.0 | 1.0 | 0.8 | 0.6 | 0.2 |
| 50≦H<100 | 1.0 | 1.0 | 1.0 | 0.7 | 0.5 | 0.2 |
| 100≦H<500 | 1.0 | 0.9 | 0.9 | 0.6 | 0.3 | 0.1 |
| 500≦H<1000 | 0.9 | 0.9 | 0.8 | 0.5 | 0.1 | 0.0 |
| 1000≦H | 0.6 | 0.8 | 0.7 | 0.4 | 0.0 | 0.0 |

Fig. 14

Reliability determining table 123

| | Item | YES | For RS | For AS |
|---|---|---|---|---|
| GPS | · Receive radio waves from four or more satellites, and travel a predetermined distance while positioning in 3D. | 1 | 10 | 0 |
| | · Receive radio waves from four or more satellites, and travel for a predetermined period while positioning in 3D. | 1 | 10 | 0 |
| | · Receives D-GPS information. | 2 | 5 | 5 |
| | : | : | : | : |
| Gyro | · The output voltage stays in a predetermined range for more than a predetermined period when stopping (vehicle speed: 0 km/h). | 2 | : | : |
| | · A center correction is applied to a detected angular velocity with an output voltage when stopping (vehicle speed: 0 km/h) as a reference relative direction. | 2 | | |
| | · A passed time is within a predetermined period after a center correction. | 1 | | |
| | : | : | | |
| Distance sensor | · A traveling distance is within a predetermined value after a distance coefficient correction. | 1 | : | : |
| | · The vehicle speed is a predetermined value or less. | 1 | | |
| | · A value after the distance coefficient correction stays within a predetermined range for predetermined consecutive times. | 1 | | |
| | · A difference between a current value after the distance coefficient correction and a previous value is a predetermined value or more. | -2 | | |
| | : | : | | |
| Map matching | · Travel a predetermined distance after a departure from a route. | -2 | : | : |
| | · Travel for a predetermined period after a departure from a route. | -2 | | |
| | · A bent determination or the like is conducted at an intersection, a branch point, or a corner to modify an estimated current position according to a road shape after a departure from a route. | 4 | | |
| | · Position candidates for current position estimation exist more than a predetermined value. | -1 | | |
| | · A differences between correlation values of position candidates for current position estimation are more than a predetermined value. | 1 | | |
| | · A difference between a traveling distance of an estimated current position and a traveling distance converted from the vehicle speed is within a predetermined value. | 1 | | |
| | · There is a road parallel to a road on which the vehicle is traveling. | -1 | | |
| | : | : | | |
| Map matching mean | | -2, -1, 1 | 5 | 5 |
| Map DB | | -2, -1, 1 | 8 | 2 |
| Whether traveling road is guiding path or not | | -2, -1, 1 | 8 | 2 |
| : | : | : | : | : |

Fig. 16

LIGHT DISTRIBUTION CONTROL APPARATUS

BACKGROUND OF THE INVENTION

1. Field of Invention

The invention relates to a light distribution control apparatus, and a light distribution control apparatus for controlling an illuminating state of headlamps mounted on a vehicle, for example.

Japanese Patent Laid-Open No. 2-296550 discloses art for conducting light distribution control according to a road shape based on information from a navigation apparatus. Japanese Patent Laid-Open No. 2-296550 discloses controlling in a field of light distribution an illuminating state of headlamps mounted on a vehicle. This light distribution control predicts a curve or the like from map data (especially road data) held by the navigation apparatus in advance, and a current vehicle position, and changes an illuminated area before the curve to increase visibility.

It is conceivable to use a predetermined function of the navigation apparatus, and a headlamp apparatus which can change the light distribution in the left/right and up/down directions, and which can change the illuminated range and illumination intensity, to determine the shape of a road to the front of, or forward of, a vehicle and a position of an intersection by using the function of navigation apparatus, and to optimally control the illuminating direction, and the illuminated range of headlamp apparatus based on a driving operation.

It is also conceivable to determine a traveling region with the navigation apparatus, and to conduct light distribution control appropriate for the traveling region.

2. Description of Related Art

Different sensor elements and logics conduct processing for detecting a current position with a navigation apparatus, and for identifying a vehicle position on road data with map matching. A detected result by the sensor elements may generate an error. An effect from this error of the sensor element deflects an illuminating direction, a range, and an illumination intensity from a direction to be illuminated.

A main purpose of the road data for the navigation apparatus is to guide a vehicle along a traveling path. However, curved roads or paths with curvatures less than a certain value are often represented non-curvilinearly. Such a curved traveling road is often misunderstood and represented incorrectly as a road which is straight, without a branch, and which continues along a long distance. Because the road data used for map matching in the navigation apparatus may not represent road shapes correctly, a light distribution may deflect away from a proper direction even when the processing for sensors and the map matching is conducted precisely.

SUMMARY OF THE INVENTION

The purpose of the present invention is to provide a light distribution control apparatus which is less affected by navigation features, and especially by detection errors of the sensor elements, and distributes light more properly.

A light distribution control apparatus is provided with a lighting apparatus for illuminating forward of a vehicle, a current position detecting means for detecting a current position of the vehicle, a map information storing means for storing at least road data for representing road shapes, a road shape acquiring means for acquiring a road shape forward of a current position detected by the current position detecting means from the road data, a road shape reliability determining means for determining a reliability of the forward road shape acquired by the road shape acquiring means, and a lighting control means for controlling a lighting state of the lighting apparatus based on the forward road shape acquired by the road shape acquiring means, and a determined result by the road shape reliability determining means to achieve the purpose described before in a form 1 of the invention.

A light distribution control apparatus is provided with a lighting apparatus for illuminating forward of a vehicle, a current position detecting means for detecting a current position of the vehicle, a map information storing means for storing at least road data for representing road shapes, a map matching means for calculating a road on which the vehicle is traveling with a high probability based on the road data and for calculating a position on the road based on the detected current position, a reliability determining means for determining at least either one of a reliability of detection element of the current position detecting means and a reliability of map matching of the map matching means, a road shape acquiring means for acquiring a road shape forward of a current position detected by the current position detecting means from the road data, a road shape reliability determining means for determining a reliability of the road shape acquired by the road shape acquiring means based on the reliability of the detection element, and the reliability of map matching determined by the reliability determining means, and a lighting control means for controlling a lighting state of the lighting apparatus based on the forward road shape acquired by the road shape acquiring means, and a determined result by the road shape reliability determining means in a form 2 of the invention.

The light distribution control apparatus according to form 1 or form 2 is further provided with a steering angle detecting means for detecting a steering angle of the vehicle where the lighting control means adopts a steering associative mode where an illuminating angle by the lighting apparatus changes according to the detected steering angle when the reliability determined by the road shape reliability determining means is low, a navigation system associative mode where the illuminating angle by the lighting apparatus changes according to the acquired forward road shape when the determined reliability is high, and a selectively associative mode where the steering associative mode is mainly adopted, and the navigation system associative mode is selectively adopted when the determined reliability is medium in a form 3 of the invention.

A light distribution control apparatus is provided with a lighting apparatus for illuminating forward of a vehicle, a current position detecting means for detecting a current position of the vehicle, a map information storing means for storing map information including at least road data for representing road shapes, a traveling region discriminating means for using the map information to discriminate a traveling region where the vehicle is currently traveling, a traveling region reliability determining means for determining a reliability of the traveling region acquired by the traveling region discriminating means, and a lighting control means for controlling an illuminated area and a glare quantity by the lighting apparatus based on the traveling region acquired by the traveling region discriminating means, and a determined result by the traveling region reliability determining means, in a form 4 of the invention.

A light distribution control apparatus is provided with a lighting apparatus for illuminating forward of a vehicle, a current position detecting means for detecting a current position of the vehicle, a map information storing means for storing at least road data for representing road shapes, a map matching means for calculating a road on which the vehicle is traveling with a high probability on the road data, and a position on the road based on the detected current position, a reliability determining means for determining at least either one of a reliability of detection element of the current position detecting means, and a reliability of map matching of the map matching means, a traveling region discriminating means for using the map information to discriminate a traveling region where the vehicle is currently traveling, a traveling region reliability determining means for determining a reliability of the determined traveling region based the reliability of detection element, and the reliability of map matching determined by the reliability determining means, and a lighting control means for controlling a lighting state of the lighting apparatus based on the traveling region discriminated by the traveling region discriminating means, and a determined result by the traveling region reliability determining means in a form 5 of the invention.

The light distribution control apparatus according to the form 4 or the form 5 has a feature that the lighting control means determines a highway illuminated area with a high glare quantity corresponding to highways, a base illuminated area with a medium glare quantity corresponding to general traveling regions, or an urban illuminated area with a low glare quantity corresponding to an urban region according to the discriminated traveling region, adopts the base illuminated area when the determined reliability of determined traveling region is low regardless of the determined traveling region, decreases the glare quantity in an illuminated area corresponding to the determined traveling region when the determined reliability of determined traveling region is medium, and selects an illuminated area corresponding to the determined traveling region when the determined reliability of determined traveling region is high in a form 6 of the invention.

A light distribution control apparatus is provided with a lighting apparatus for illuminating forward of a vehicle, a current position detecting means for detecting a current position of the vehicle, a map information storing means for storing at least road data for representing road shapes, a matching means for calculating a road on which the vehicle is traveling with a high probability on the road data, and a position on the road based on the detected current position, a reliability determining means for determining at least either one of a reliability of an detection element of the current position detecting means and a reliability of the matching means, and a lighting control means for controlling a lighting state of the lighting apparatus based on a determined result by the reliability determining means in a form 7 of the invention.

A light distribution control apparatus is provided with a lighting apparatus for illuminating forward of a vehicle, a current position detecting means for detecting a current position of the vehicle, a map information storing means for storing at least road data for representing road shapes, a road data reliability determining means for determining a reliability of the road data corresponding to the detected current position, and a lighting control means for controlling a lighting state of the lighting apparatus based on a determined result by the road data reliability determining means in a form 8 of the invention.

The light distribution control apparatus according to the form 8 is further provided with a road property judging means for judging a road property of a road on which the vehicle is traveling based on the road data, and a region property judging means for judging a region property of a region in which the vehicle is traveling based on the road data where the road data reliability determining means determines the reliability of road data based on either one of the road property and the region property in a form 9 of the invention.

The light distribution control apparatus according to the form 9 has a feature that the road data is classified by at least either one of the road width and the road type as the road property in advance in a form 10 of the invention.

The light distribution control apparatus according to the form 9 has a feature that the road data is classified into at least either one of an urban region, a non-urban region, an underpopulated region, a metropolitan region, a flatland region and a mountain region as the region property in advance in a form 11 of the invention.

Various exemplary embodiments of the invention provide a light distribution control apparatus with a lighting apparatus for illuminating forward of a vehicle, a current position detecting means for detecting a current position of the vehicle, a map information storing means for storing at least road data for representing road shapes, a path searching means for searching for a traveling path to a destination, an on-guiding path reliability determining means for determining a reliability that the detected current position of vehicle is on the searched traveling path, and a lighting control means for controlling a lighting state of the lighting apparatus based on a determined result by the on-guiding path reliability determining means in a form 12 of the invention.

The light distribution control apparatus according to the form 2 or the form 5 has a feature that the reliability determining means determines the reliability while considering whether there is a road above, below, left of, or right of, and parallel to the road on which the vehicle is traveling with a high probability in a form 13 of the invention.

These and other features and advantages of this invention are described in, or are apparent from, the following detailed description of various exemplary embodiments of the system and methods according to this invention.

BRIEF DESCRIPTION OF THE DRAWINGS

Various exemplary embodiments of the systems and methods of this invention will be described in detail with reference to the following figures, wherein:

FIG. 2 is a reliability determining table according to the exemplary embodiment shown in FIG. 1.

FIG. 6 illustrates light distribution patterns corresponding to a traveling region and a road shape, and control statuses of the individual light distribution patterns of the exemplary embodiment shown in FIG. 1.

FIG. 13 is a table setting a reliability ratio $\epsilon 2$ of road data obtained from a road class (type) property, and a region property of the second exemplary embodiment.

FIG. 14 is another table setting a reliability ratio $\epsilon 2$ of road data of the second exemplary embodiment.

FIG. 16 is a flowchart conceptually showing a content of a reliability determining table of a third exemplary embodiment.

DETAILED DESCRIPTION OF PREFERRED EMBODIMENTS

Figure 1:
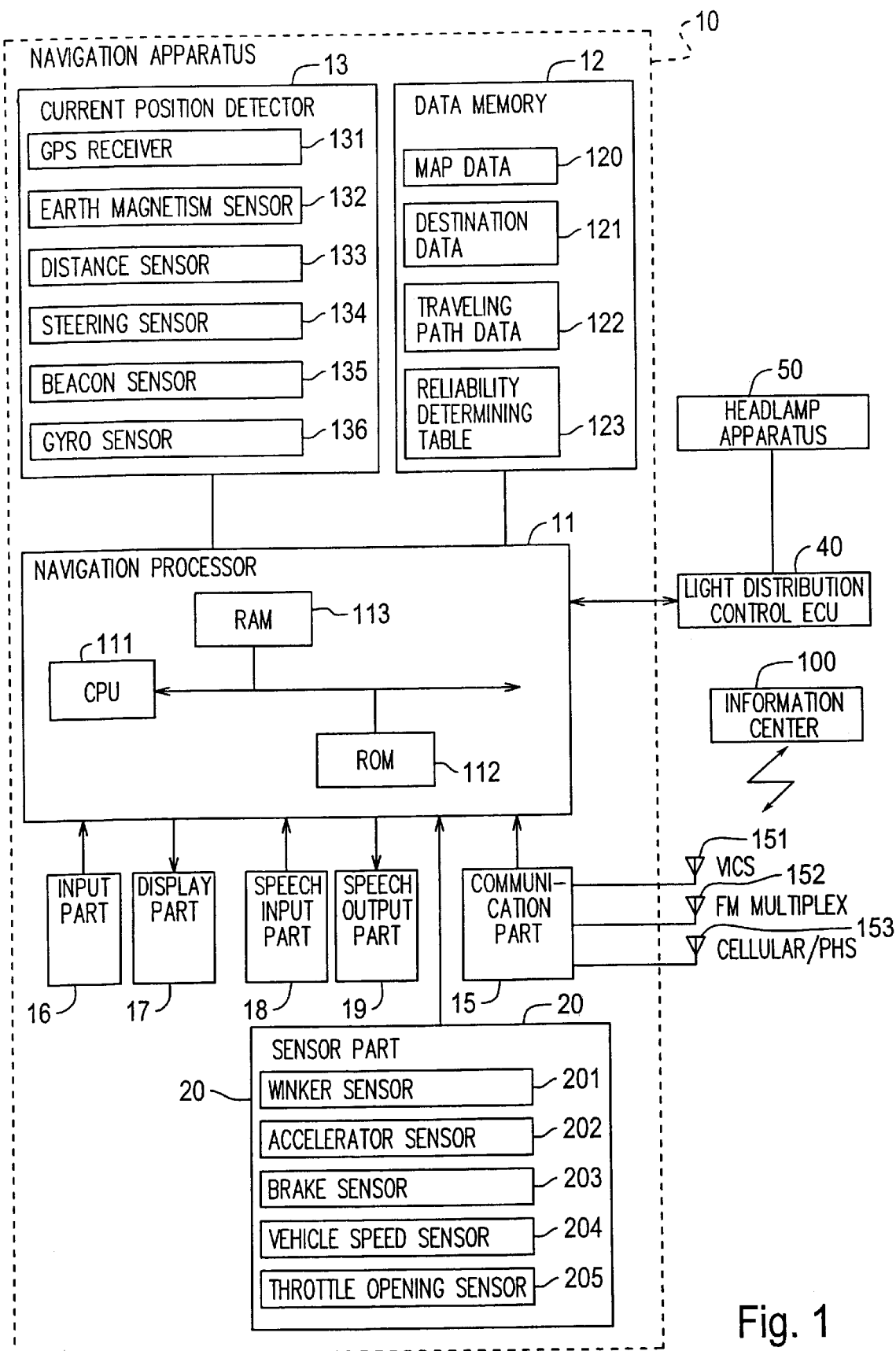
FIG. 1 is a block diagram illustrating one exemplary embodiment of a light distribution control apparatus of the invention.

The following section describes preferred exemplary embodiments of a light distribution control apparatus of the invention in detail while referring to FIG. 1 to FIG. 16.

A light distribution control apparatus of exemplary embodiments of the invention controls an illuminated area and a glare quantity according to a traveling region (highway, general road (suburb), urban region) of a vehicle determined by a navigation processor, and an illuminating direction according to a determined road shape. Namely, a lighting apparatus is controlled such that the illuminated area and the glare quantity (highway: high glare, general road: medium glare, urban region: low glare) are determined according to the traveling region, and an illuminating angle changes according to a direction toward which a road curves with the front end of a vehicle as a base according to a road shape.

On the other hand, the navigation processor detects a current position, and determines a reliability of the road shape and of the traveling region for a vehicle position based on road data.

When it is determined that the reliability of the traveling region is low, default values (base illuminated area, and medium glare) is selected regardless of a determined traveling region. When the reliability of the traveling region is medium, the glare quantity is decreased, and the illuminated area corresponds to the traveling region, and when the reliability of the traveling region is high, the illuminated area and the glare quantity correspond to the traveling region.

With respect to the reliability of road shape, a steering associative mode where the illuminating angle changes according to a steering angle is selected when the reliability is low. A navigation system associative mode where the illuminating angle changes according to a road shape to the front or forward of the vehicle position determined from road data is selected when the reliability is high. A selectively associative mode where the steering associative mode is mainly adopted, and the navigation system associative mode is selectively adopted when the reliability of the road shape is medium.

In this way, the reliability of traveling region and the reliability of the traveling road shape are determined, and traveling region and mode are changed based on the result of determining the reliabilities, thereby conducting proper light distribution control.

A vehicle position after T seconds (position after T seconds) from a current vehicle position is calculated from a vehicle speed (v), the road data for navigation, and the like in the navigation system associative mode. In addition, the light distribution angle of headlamps is controlled such that the position after T seconds is illuminated. This is because a driver traveling on a road generally tends to gaze at a position after a certain time (T=1.5 seconds, for example) regardless of the vehicle speed. This control increases the visibility such that the light distribution angle is controlled toward the gazed at position.

FIG. 1 is a block diagram representing a light distribution control apparatus of a first exemplary embodiment.

As shown in FIG. 1, the light distribution control apparatus of the present embodiment is provided with a navigation apparatus 10, a light distribution control ECU (Electronic Control Unit) 40, and a headlamp apparatus 50.

The navigation apparatus 10 includes a navigation processor 11, a data memory 12 functioning as a map information memory means, a current position detector 13, a communication part 15, an input part 16, a display part 17, a speech input part 18, a speech output part 19, and a sensor part 20.

The navigation processor 11 is connected with the light distribution control ECU 40 and other different ECU's (such as a vehicle ECU, and a column ECU) through an onboard LAN (Local Area Network).

The navigation processor 11 is provided with a CPU (Central Processing Unit) 111 for conducting different types of arithmetic operations such as the navigation processing based on entered information, and providing the results. The CPU 111 is connected with a ROM 112 and a RAM 113 through a bus line such as a data bus.

The ROM 112 is a read only memory for storing different types of programs for conducting a search for a planned traveling path to a destination, a guidance along the path, and the light distribution control processing of the present embodiment. The RAM 113 is a random access memory for serving as a working memory when the CPU 111 conducts different types of the arithmetic operations.

The ROM 112 mainly stores different types of processing programs, and arithmetic equations for road shape reliability determining processing, traveling region reliability determining processing, illuminating position calculating processing in the navigation system associative mode, and processing for deciding a wide area light distribution mode number in the light distribution control processing. The CPU 111 executes the individual programs to realize individual functions corresponding to a current position detecting means, a road shape acquiring means, a road shape reliability determining means, a lighting control means, a traveling region discriminating means, and a traveling region reliability determining means.

A current position detecting function is a function for obtaining a current position from a current position coordinate obtained by a GPS receiver 131, and a result of map matching processing for matching a previous (last) traveling record (calculated by a gyro sensor 136, and a distance sensor 133) with the road data.

A road shape acquiring function is a function for determining a road shape to the front of or forward of the current vehicle position from the current position obtained by the map matching processing, and the map data.

A road shape reliability determining function is a function for determining a reliability of the road shape forward of the vehicle obtained by the road shape acquiring function from the individual detecting means used in the current position detecting function (such as GPS receiver 131), or an error in the map matching processing.

A traveling region discriminating function is a function for discriminating a traveling region of a point at which the vehicle is traveling from the current position obtained from the map matching processing, and the map data.

A traveling region reliability determining function is a function for determining a reliability of a discriminated traveling region from the reliability of map data, and the error in the map matching processing.

A lighting control function is a function for controlling a beam illuminating angle, an illuminated area, and a glare quantity by the headlamp apparatus 50 such as headlamps. This function is a function for conducting light distribution control corresponding to the current vehicle position determined by the current position detecting function, and a control mode selected by a mode selecting function.

The current position detector 13 is provided with the GPS receiver 131, an earth magnetism sensor 132, the distance sensor 133, a steering sensor 134, a beacon sensor 135, and a gyro sensor 136.

The GPS receiver 131 is an apparatus which receives radio waves transmitted from multiple satellites, and measures a position of the vehicle.

The earth magnetism sensor 132 detects earth magnetism, and obtains a direction toward which the vehicle orients. An apparatus for detecting and counting the number of rotations of a wheel, an apparatus for detecting acceleration and Integrating twice, or other measuring is used as the distance sensor 133.

An optical rotation sensor, or a rotating resistance volume mounted on a rotating part of a steering wheel is used as the steering sensor 134, and an angle sensor mounted on the wheel may be used. The steering sensor 134 detects a steering operation quantity (steering angle) θ, and provides the navigation processor 11 and the light distribution control ECU 40 with θ.

The beacon sensor 135 receives position information from a beacon placed on the road. The gyro sensor 136 is constituted with a gas rate gyro, a vibration gyro, or the like which detects an angular velocity of the vehicle, and integrates the angular velocity to detects a direction of the vehicle. The gyro sensor can detect a lateral acceleration (lateral G) applied to the vehicle.

Though the GPS receiver 131 and the beacon sensor 135 in the current position detector 13 independently measure a position, a combination of a distance detected by the distance sensor 133, and a direction detected by the earth magnetism sensor 132 and the gyro sensor 136, or a combination of the distance detected by the distance sensor 133, and the steering angle detected by the steering sensor 134 detects an absolute position of the vehicle (current position of the vehicle) alternatively.

The communication part 15 receives/transmits different types of data from/to an FM receiver, a telephone line, and the like, and receives road information such as information on congestion or information on a traffic accident, for example, that is transmitted from an information center 100. The communication part 15 can receive (obtain) at least one type of map data around the current vehicle position, road data around the current vehicle position, location type data determined according to individual location (region) corresponding to a neighborhood of the current vehicle position, and traveling path data to a destination used in this exemplary embodiment.

The communication part 15 is connected with at least one of different types of antennas such as a VICS antenna 151, a FM multiplex broadcast antenna 152, and a cellular phone/PHS antenna 153 to receive these different types of data.

The input part 16 is constituted so as to modify the current position of the vehicle when starting traveling, and to enter a destination. Examples of the input part 16 include a touch panel which is placed on a screen of a display constituting the display part 17, and receives information when a key or a menu displayed on the screen is touched, by a keyboard, a mouse, a barcode reader, a light pen, and/or a remote control apparatus for a remote operation.

The display part 17 shows different types of displays such as an operation guide, an operation menu, an operation key, a path to a guide point set according to a request from a user, and a guide figure along a path to travel. A CRT display, an LCD display, a plasma display and a hologram display apparatus for projecting a hologram on a wind shield are or may be used as the display part 17.

The speech input part 18 may include a microphone and the like, and receives required information such as speech. The speech output part 19 is provided with a speech synthesizing apparatus and a speaker. The speech output part 19 provides guide information such as speech synthesized by the speech synthesizing apparatus. Different types of guide information may be recorded in a speech storing apparatus, such as a tape, in addition to the speech synthesized by the speech synthesizing apparatus, and may be provided from the speaker, or a synthesized sound from the speech synthesizing apparatus and the speech from the speech storing apparatus may be combined.

The sensor part 20 is provided with different types of sensors such as a winker sensor 201, an accelerator sensor 202, a brake sensor 203, a vehicle speed sensor 204, and a throttle opening sensor 205.

The vehicle speed sensor 204 detects a current vehicle speed (v), and provides the navigation processor 11 with the detected current speed (v). Though a vehicle speed sensor provided for the vehicle to control the vehicle is used as the vehicle speed sensor 204, it is possible to provide an independent sensor for this exemplary embodiment.

The data memory 12 stores map data 120, destination data 121, traveling path data 122, a reliability determining table 123, and other different types of data.

The map data 120 store data on maps such as geography data, wide area map data, urban map data, and road data.

The road data stored in the map data 120 store the following data as information for identifying road characteristics connecting between intersections. Namely, the road data store intersection numbers, node numbers, node information, link lengths, crossing angles of the links, road widths, and road names. The individual links store lane number of roads, and an existence of a tunnel as link information.

Road numbers crossing at intersections, guide subject enable flags which indicate whether a road is subject to a guide or not (such as a road not allowing entry), landmark position type data, intersection picture data, guidance data on exit ramps for an expressway, and intersection numbers are stored as intersection data.

The node information is information on one point on a road. That which connects between nodes is referred to as a link. Connections between individual nodes among multiple node rows with links represents a road. A road shape may be defined with an altitude in addition to the node and the link. Altitude data of this exemplary embodiment are held by individual points in a matrix arrangement with an interval of 250 m in the horizontal and vertical directions independently to the nodes. The altitude of each node is calculated as an altitude of the node on a plane comprising three points including the node inside. It is possible to store an altitude data associated with a node at the point of node.

A curvature radius of a road at a node (node radius) is obtained based on a crossing angle of links neighboring to the node.

The destination data 121 of the data memory 12 stores data (base data) for showing a destination set in the path search on the display 17, destination names and their pronunciations, destination districts, latitudes and longitudes as coordinate data of the destinations, intersection numbers assigned to intersections on both ends of roads leading to the destinations, telephone numbers, and addresses.

The destination name is a name of different types of locations which can be selected as a destination such as a building, a public facility, and a park. The destination district is a district for classifying individual destinations, and classified into different types of districts such as a golf course, a place of interest, a hot spring, a skiing ground, a shrine/temple, an amusement park, a camp ground, a castle/ruin of a castle, a zoological garden/botanical garden, a station, a parking lot, a school, a harbor/airport, a public office, a hospital, a swimming beach and other.

The traveling path data 122 stores information on a traveling path searched to a destination.

The reliability determining table 123 stores conditions for determining a reliability based on different types of detecting elements and processing, and evaluation scores for scoring evaluation of the individual items.

The navigation processor 11 sets an evaluation timing, conducts reliability determining processing at the individual evaluation timing, refers to the reliability determining table 123, evaluates a reliability of the individual detecting elements such as the current position detector 13, and the winker sensor 201, the accelerator sensor 202, the brake sensor 203, the vehicle speed sensor 204, and the throttle opening sensor 205 in the sensor part 20, and evaluates the reliability of the result of the map matching processing based on the map matching function, thereby determining the reliability of a road shape to the front of or forward of the vehicle, and the reliability of the traveling region.

Evaluation indices are defined corresponding to the level of reliability of the individual detecting elements in the reliability determining table 123. A calculated evaluation index can be added to/subtracted from a previous index.

FIG. 2 conceptually represents a part of the reliability evaluating table.

As exemplified in FIG. 2, the reliability evaluating table prescribes items for the detecting elements such as the GPS receiver 131, the gyro sensor 136, and the distance sensor 133, items relating to the map matching, and other items.

As exemplified in FIG. 2, an evaluation index for the GPS receiver 131 is set to 1 when a vehicle travels a predetermined distance while receiving radio waves generated from four or more satellites and conducting 3D positioning.

For example, the evaluation index for GPS receiver 131 is set to 1 when a vehicle travels for a predetermined period while receiving radio waves generated from four or more satellites and conducting 3D positioning.

The evaluation index is set to 2 when the communication part 15 is receiving D-GPS information.

A plus evaluation index is set when bent determination, curve determination, and the like are conducted based on the road data, a current position is corrected, and the altitude is 500 m or less while receiving radio waves generated from at least three or more satellites, and conducting 2D positioning which is not described in FIG. 2.

On the other hand, minus values are set to reduce the evaluation index when the vehicle travels a predetermined distance while the GPS receiver 131 is not receiving radio wave generated from a satellite; when the vehicle travels for a predetermined period while the GPS receiver 131 is not receiving radio waves generated from a satellite, when the vehicle travels a predetermined distance while conducting 2D positioning, when the vehicle travels for a predetermined period while conducting 2D positioning, an inclination of a road is detected while conducting 2D positioning, or other cases.

As exemplified in FIG. 2, an evaluation index for gyro sensor 136 is set to 2 when a output voltage of the gyro sensor 136 stays in a predetermined range for a predetermined period while the vehicle is stopping (when the vehicle speed V=0 km/h).

The evaluation index is set to 2 when a center correction is conducted for a detected angular velocity with the output voltage when stopping (when the vehicle speed V=0 km/h) as a base value for a relative direction. The evaluation index is set to 1 when it is within a predetermined period after the center correction.

The evaluation index for gyro sensor 136 is set to high when a predetermined period, ten minutes for example, does not pass after a detected value for a direction toward which the vehicle orients is corrected, which is not described in FIG. 2.

As exemplified in FIG. 2, an evaluation index for distance sensor 133 is set to 1 when the traveling distance after a distance correction is less than a predetermined distance, 500 m for example, and the evaluation index is set to 1 when the vehicle speed V is less than a predetermined value, 100 [km/h] for example.

An evaluation index for vehicle speed sensor 204 is set to plus when a value after a distance coefficient is corrected falls in a predetermined range predetermined times if the distance coefficient is corrected, and the evaluation index is set to minus when a difference between the current distance coefficient and the previous distance coefficient is a predetermined value or more, which is not described in the FIG. 2.

The distance coefficient is corrected based on road data between bent points, or pulse number of the vehicle speed sensor 204 when the vehicle travels between bent points, or a value detected by the GPS receiver 131. A traveling distance after the distance coefficient is corrected may change the evaluation index.

An evaluation index is set corresponding to the level of reliability of the map matching means in the reliability evaluating table 123 as exemplified in FIG. 2.

For example, the evaluation index is set to −2 when the vehicle travels a predetermined distance while the vehicle is departed from a route, and when the vehicle travels for a predetermined time while the current position is departed from a route.

On the other hand the evaluation index is set to 4 when the bend determination and the curve determination are conducted for a departure from a route, an intersection, a branch point, and a corner, and an estimated current position is corrected according to a road shape (matching of the current position is conducted).

The evaluation index is set to −1 when the number of position candidates in the current position estimation in the map matching is more than a predetermined value, and the evaluation index is set to 1 when a difference between a first position candidate and a second position candidate is more than a predetermined value for the current position estimation.

The evaluation index is set to 1 when a difference between a travel distance of an estimated current position and a travel distance converted from the vehicle speed is within a predetermined value.

The evaluation index is set to −1 when there is a road parallel to a road on which the vehicle is traveling. The parallel road here means a parallel road above or just below, or in a right neighborhood of or a left neighborhood of (within 10 m, for example) the road on which the vehicle is traveling.

The evaluation index is set to −1 when the vehicle is not departed from a route, and an estimated position is out of a road, which is not described in FIG. 2.

It is possible to change the evaluation index according to whether there is a candidate road whose correlation value with an estimated current position calculated from the map matching processing in the navigation processor 11 is smaller than a set value. In this case, a current position detected by the current position detector 13 is decided as the estimated current position, a road on which the vehicle travels with high probability is decided as the candidate road based on the estimated current position, and a position at which the vehicle travels at high probability is decided as a candidate position respectively. The navigation processor 11 calculates values representing the correlation between the estimated current position and the individual candidate roads, and the correlation between the estimated current position and the individual candidate positions, namely correlation values (such as a sum of distances between nodes, and a matching level of road shape), selects a candidate road and a candidate position with the minimum correlation values among the individual candidate roads and the individual candidate positions, and decides them as a road and a current position on which and at which the vehicle is actually traveling with the highest probability (refer to Japanese Patent Laid-Open No. 6-147906 and Japanese Patent Laid-Open No. 711424).

After a departure from a route occurs while recognizing a current position after an automatic search, if a search from the current position is automatically conducted again, and a new path is set, because a departure from a route may occur because of an error of the current position, and another candidate road may be selected, the evaluation index is set to minus. The evaluation index may be set to plus if a candidate road is not generated while traveling a predetermined distance after a new path is set.

The evaluation index is set to minus for a candidate road when there is a road other than the candidate road within a predetermined distance from an estimated current position, when there is a road other than the candidate road within a predetermined distance from an estimated current position, and an angle between the road and the candidate road is a predetermined angle or less, and when another candidate road is set continuously along a predetermined distance within a predetermined range.

The evaluation index is set to minus for correcting a current position because the travel on a map may be abnormal (there is an error in the current position), when a detected speed at the current position (change of the current position in a unit period) is a predetermined value or more.

It is possible to set an evaluation index according to road surface conditions.

Items used for determining the road shape reliability, items used for determining the traveling region reliability, and items used for the combination of road shape reliability and traveling region reliability are determined for the individual evaluation indices described above.

For example, items relating to the distance sensor 133 and the vehicle speed sensor 204 are used for determining the road shape reliability, the other items relating to the GPS receiver 131 and the gyro sensor 136, and items relating to the map matching are used for the reliability of both.

Other correspondence of items used for determining the reliability is possible, and it is possible to set an evaluation index for determining the road shape reliability, and an evaluation index for determining the traveling region for individual items.

One or multiple memory apparatuses of different types such as a DVD (Digital Versatile Disc), an MO (Magnetic Optical Disc), a CD-ROM (Compact Disc Read Only Memory), an optical disc, a magnetic tape, an IC card, and an optical card are used as the data memory 12 shown in FIG. 1.

It is preferable to use a CD-ROM or a DVD which has a large memory capacity, for example, for the map-data 120 and the destination data 121. It is possible to store at least either one of the traveling path data 122 and the control mode data in the same memory medium as the map data 120, and it is possible to store them on another medium such as an IC card. The traveling path data 122 may be stored in the RAM 113 instead of the data memory 12, or in addition to the data memory 12, until the vehicle arrives at a destination.

The navigation apparatus 10 constituted as described above provides a driver with road information around a current vehicle position, and guides the driver along a traveling path to a vehicle destination. Namely, when a destination is entered at the input part 16, the navigation processor 11 uses road data read from the data memory 12 to search a traveling path to the destination based on the current position of self-vehicle detected by the current position detector 13. It provides the display part 17 with a searched traveling path, and guides the driver to the destination with the traveling path shown on the display part 17, and speech is or may be provided from the speech output part 19.

Though the navigation apparatus 10 of this exemplary embodiment is provided with a path guidance function, the navigation apparatus 10 may comprise individual functions for the light distribution control, and may not be provided with other functions otherwise in the disclosure of the invention. For example, the display part 17 and the speech output part 19 for path guidance may not be provided.

The navigation processor 11 of this embodiment provides the light distribution control ECU 40 with a light distribution pattern number and a glare quantity decided based on the determination of the traveling region and its reliability determination, and a light distribution angle θ h (θ h=0 when traveling straight not turning) decided based on the road shape and its reliability determination as exemplified in FIG. 6.

Namely, the navigation processor 11 provides the light distribution control ECU 40 with number 0 for a base pattern of the light distribution pattern, and a medium glare quantity when the reliability of the traveling region is low.

It provides the light distribution control ECU 40 with any one of number 2 for an expressway traveling pattern, and a high glare quantity of 0 for a general traveling pattern (base pattern), a medium glare quantity of 1 for an urban traveling pattern, and a low glare quantity when the reliability of the traveling region is high.

It provides the light distribution control ECU 40 with a pattern number corresponding to the traveling region, and a glare quantity which is one step lower than that for a case with the high reliability when the reliability of traveling region is medium.

Figure 3:
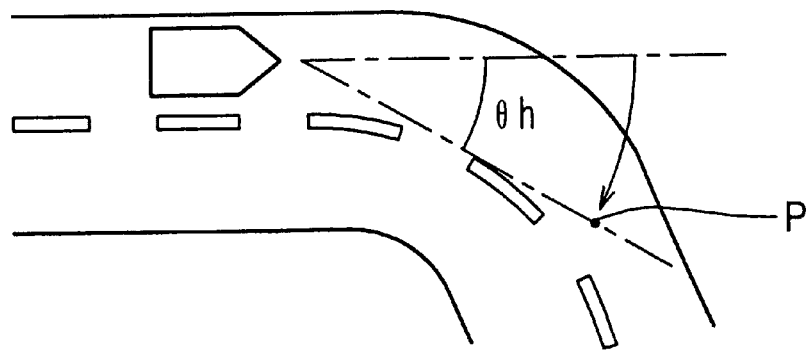
FIG. 3 illustrates a light distribution angle θ h of the exemplary embodiment shown in FIG. 1.

FIG. 3 shows the light distribution angle θ h in the navigation system associative mode.

The navigation processor 11 calculates a light distribution angle θ h for a vehicle position P after T seconds, and provides the light distribution control ECU 40 with the calculated light distribution angle θ h (θ h=0 when traveling straight) when the navigation system associative mode is selected or the navigation system associative mode is selected in the selectively associative mode as described in FIG. 3.

On the other hand, the navigation processor 11 obtains a light distribution angle θ h corresponding to a steering angle detected by the steering sensor 134 in the steering associative mode, and provides the light distribution control ECU 40 with it.

The light distribution control ECU 40 changes a light converging state and a light diffusing state of the headlamp apparatus 50, and controls the glare quantity and the light distribution angle θ h according to the light distribution control data provided from the navigation processor 11.

Though the headlamp apparatus 50 is generally thought of as comprised with conventional headlamps provided on the left and right sides of the front of a vehicle, a headlamp apparatus other than this configuration may be provided.

Figure 4:
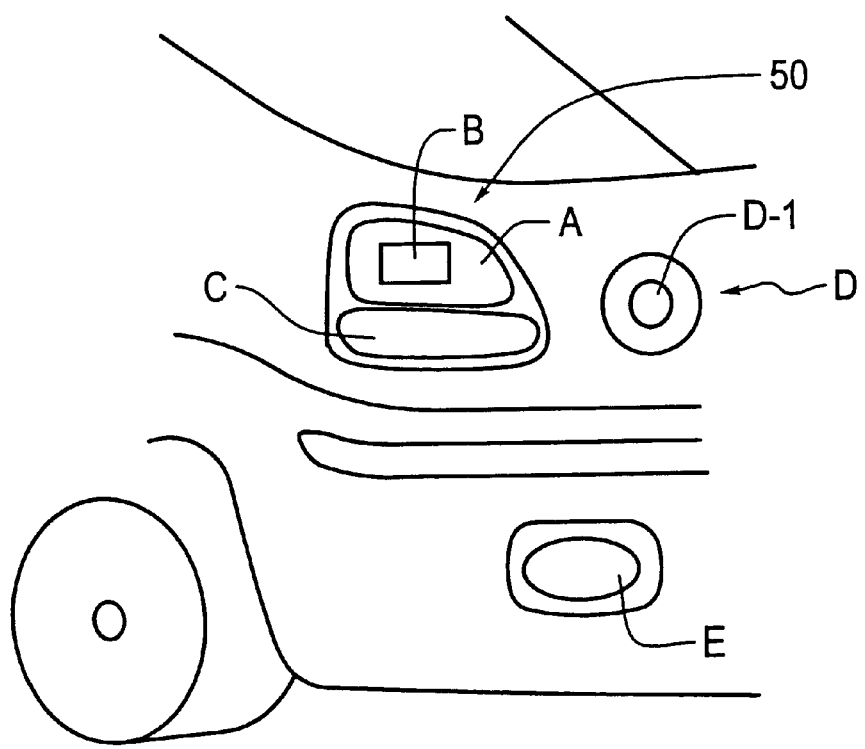
FIG. 4 illustrates a lamp arrangement constituting a headlamp apparatus of the exemplary embodiment shown in FIG. 1.

FIG. 4 shows a lamp arrangement constituting the headlamp apparatus 50. The headlamp apparatus 50 comprises headlamps A serving as main lights, bending lamps C serving as auxiliary lamps, and beams for high speed traveling D serving as auxiliary lamps as shown in FIG. 4.

Direction indicators E are provided under the headlamp apparatus 50.

The headlamp A is always lit when a headlamp switch is on, and switching to a high beam (H beam) and a low beam (L beam) is available.

A movable reflector (reflecting mirror) B is provided inside the headlamp A to expand a part of the beam left and right. The movable reflector B moves in a predetermined range where the center side of the vehicle is negative, and the outer side of the vehicle is positive.

The angle of the movable reflector B changes according to the light distribution angle θ h provided from the navigation processor 11 in this exemplary embodiment.

The bending lamp C is fixed, and is an auxiliary lamp for illuminating a wide range close to a vehicle (for example, within 20 m to the front of or forward of the vehicle), and is set to turn on mainly at or in an intersection.

The beam for high speed traveling D is for illuminating an area far from the vehicle (for example, 50 m to 130 m to the front of or forward of the vehicle). A light axis of the reflector D-1 of the beam D is moved up and down manually or automatically to move the entire light distribution in the up and down direction.

Figure 5:
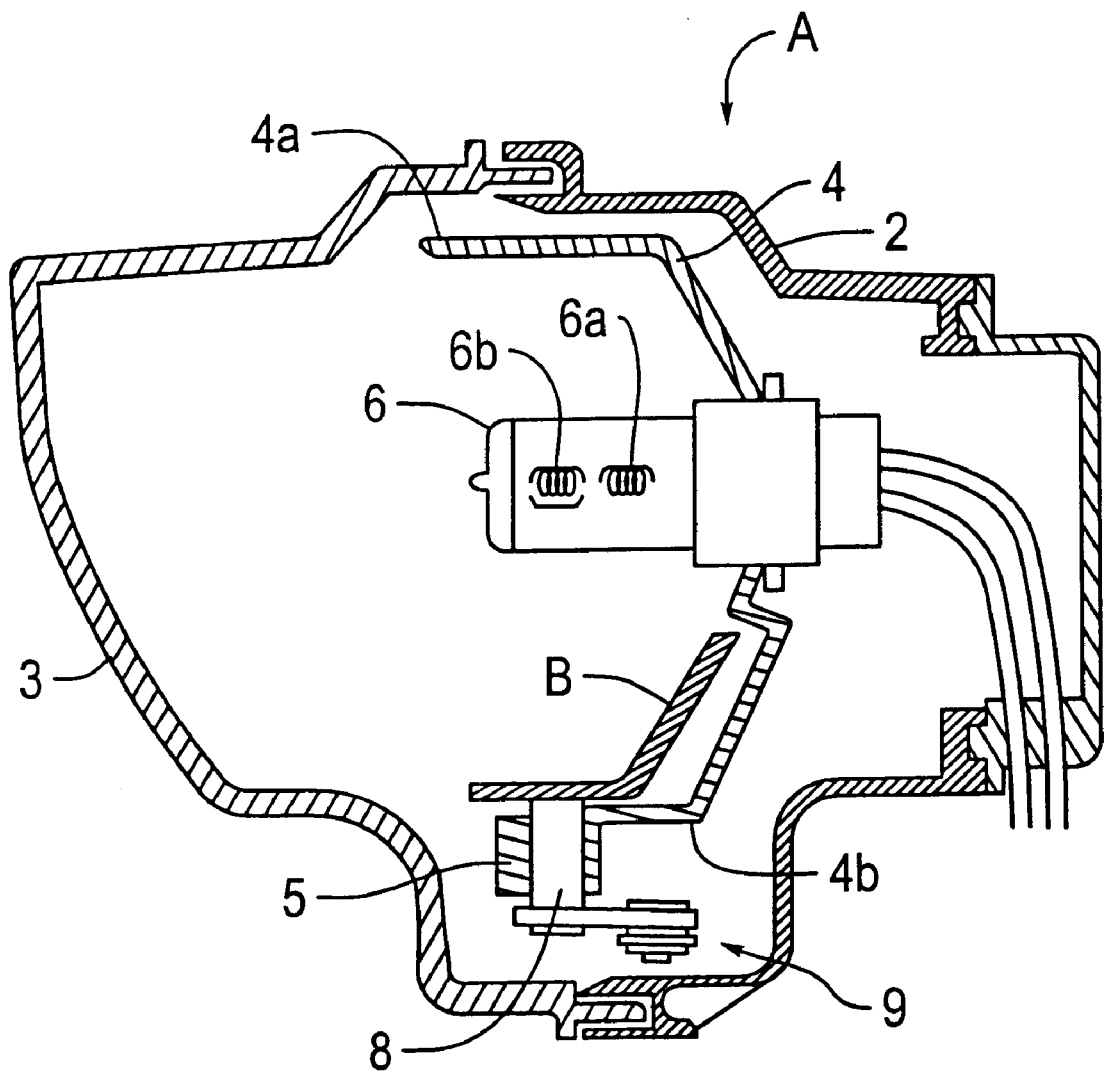
FIG. 5 is a schematic diagram of a headlamp of the exemplary embodiment shown in FIG. 1.

FIG. 5 shows an exemplary configuration of headlamp A.

The headlamp A is provided with a lamp body 2 fixed to a vehicle body as shown in FIG. 5. The lamp body 2 is formed with synthetic resin, and a recess orienting a forward direction is formed.

A lens 3 is mounted on the lamp body 2 so as to cover a front opening, and a lamp space surrounded by the lamp body 2 and the lens 3 is formed.

A fixed reflector 4 which is wide in the horizontal direction viewed from the front, and whose reflecting surface is almost a paraboloid of revolution is provided in the lamp space. An illuminating axis of this reflecting surface faces almost forward.

Flat parts 4a and 4b, protruding almost forward, are integrally formed from an upper edge and a lower edge of the fixed reflector 4, and a bearing tube 5 is fixed almost at the center of lower flat part 4b.

A light source bulb 6 is mounted almost at the center of fixed reflector 4 such that a light emitting part 6a for a high beam (filament) is almost at a focus position of the fixed reflector 4. A light emitting part 6b for a low beam (filament) is provided forward of the light emitting part 6a.

A rotating shaft 8 is rotatably inserted through the bearing tube 5, both an upper end and a lower end respectively protrude from an upper end and a lower end of the bearing tube 5.

A movable reflector B is fixed to the upper end of rotating shaft 8. A reflecting surface of the movable reflector B almost forms a paraboloid of revolution, an illuminating axis is parallel to the illuminating axis of fixed reflector 4 when it faces forward, and a focus of it is positioned at the focus position of fixed reflector 4.

One end of a link mechanism 9 is connected with the lower end of rotating shaft 8, and a driving part (suppressed from the drawing) for rotating the movable reflector B is connected to the other end of link mechanism 9 through the link mechanism 9 and the rotating shaft 8.

The rotating shaft 8, the link mechanism 9, and the driving part constitute a movable mechanism for turning the angle of movable reflector B left and right, thereby controlling the light distribution angle θ h.

The light distribution control ECU 40 controls the movable mechanism of headlamp A, turning on/off of the bending lamp C, turning on/off the beam for high speed traveling D, and moving up/down the reflector D-1 such that a light distribution pattern supplied from the navigation apparatus 10 is realized.

FIG. 6 shows schematics of light distribution patterns according to the traveling regions, the road shapes and the corresponding control states of the headlamp apparatus 50 in the individual light distribution patterns.

A light distribution pattern number 2 is set when the traveling region is an expressway, as described in FIG. 6. The light distribution control ECU 40 controls such that the headlamps A are set to the H beam, the bending lamps C are turned off, the beams for high speed traveling D are turned on, and the reflectors D-1 are set to up to realize this light distribution pattern. As a result, though glare quantity to oncoming vehicles is large, a distant location is lit and a field of view is secured, thereby providing a light distribution proper for high speed traveling.

When the traveling region is a general road (suburban road), a light distribution pattern number 0 is set if the evaluation index of the traveling region reliability is low. The light distribution control ECU 40 controls such that the headlamps A are set to the L beam, the bending lamps C are turned off, the beams for high speed traveling D are turned on, and the reflectors D-1 are set to down to realize this light distribution pattern. As a result, the glare quantity to oncoming vehicles is medium.

When the traveling region is an urban region (except for intersections), a light distribution pattern number 1 is set. The light distribution control ECU 40 controls such that the headlamps A are set to the L beam, the bending lamps C are turned off, and the beams for high speed traveling D are turned off to realize this light distribution pattern. As result, the glare quantity to oncoming vehicles is small, dizziness to oncoming vehicles and pedestrians is avoided, thereby providing a light distribution proper for an urban region with a large number of oncoming vehicles and pedestrians.

A light distribution pattern 3 is set as a light distribution pattern when the vehicle reaches a point 50 m before an intersection. The light distribution control ECU 40 controls such that the headlamps A are set to the L beam, the bending lamps C are turned on, and the beams for high speed traveling D are turned off to realize this light distribution pattern. As a result, the glare quantity to oncoming vehicles is small, dizziness to oncoming vehicles and pedestrians is avoided, thereby providing a light distribution proper for an intersection with a large number of oncoming vehicles and pedestrians.

Turning on the bending lamp C extends the illuminated area near the vehicle to left and right largely, thereby illuminating a wide area near an intersection as shown in FIG. 6.

The light distribution control ECU 40 follows the light distribution angle θ h supplied from the navigation processor 11, and controls the movable reflectors B to a front direction when the road shape is straight (light distribution angle θ h=0) for the individual light distribution patterns On the other hand, it corresponds to the light distribution angle θ h≠0, and rotates the movable reflectors B toward left/right when the road shape is curved. This increases the illuminated areas in the left and right directions compared with the straight road shape.

FIG. 6 shows a light distribution pattern when the road shape curves to the right side of a traveling direction (when turning right), indicates a case where the right side extends as compared with that in the case where the traveling direction remains straight. The light distribution is similarly, though inversely, controlled when the left side of a traveling direction extends for a left side curve (left turn).

Figure 7:
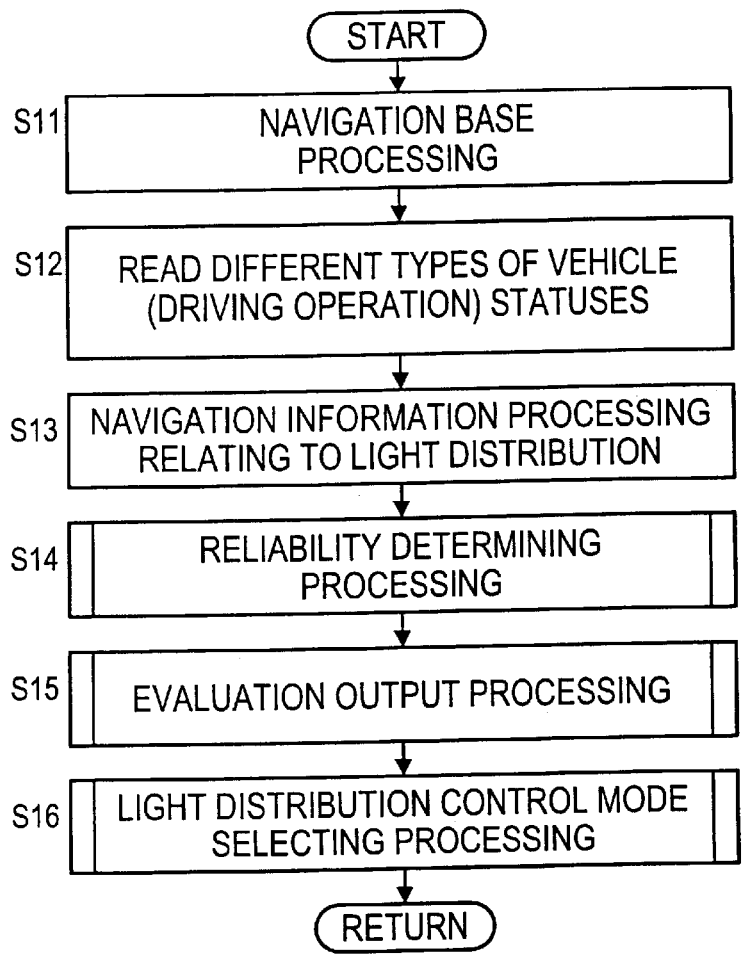
FIG. 7 is a flowchart showing a processing operation of light distribution control of the exemplary embodiment shown in FIG. 1.

The following section describes a processing operation for the light distribution control by the light distribution control apparatus while following the flowchart shown in FIG. 7.

The navigation processor 11 conducts a navigation base processing (Step 11). Namely, the navigation processor 11 uses the current position detector 13 to detect a current position, and uses the map matching processing to obtain a vehicle position based on the road data.

Then, the navigation processor 11 reads different types of vehicle (driving operation) statuses such as the vehicle speed, a yaw rate, the winker, the headlamp switch, and the steering (steering operation) angle (Step 12).

Then, the navigation processor 11 conducts a navigation information processing relating to the light distribution (Step 13). Namely, the navigation processor 11 detects an intersection which exists to the front of or forward of the current vehicle position, and calculates a curvature of a road shape to the front of or forward of the vehicle, calculates a position P forward of the vehicle after T seconds (see FIG. 3) from the curvature and the vehicle speed, and decides a light distribution angle θ hn to irradiate the position P after T seconds. It also decides a light distribution angle θ hs corresponding to the steering angle detected by the steering sensor 134.

Further, it determines a traveling region (such as an expressway, an urban region, and a general road) at a current vehicle position.

Then, the navigation processor 11 calculates the evaluation indices for reliability of the road shape, and the evaluation indices for reliability of the traveling region for individual items following the reliability determining table 123 (Step 14).

Then, the navigation processor 11 conducts an evaluation output processing (Step 15), before finally conducting a light distribution control mode selecting processing (Step 16).

Figure 8:
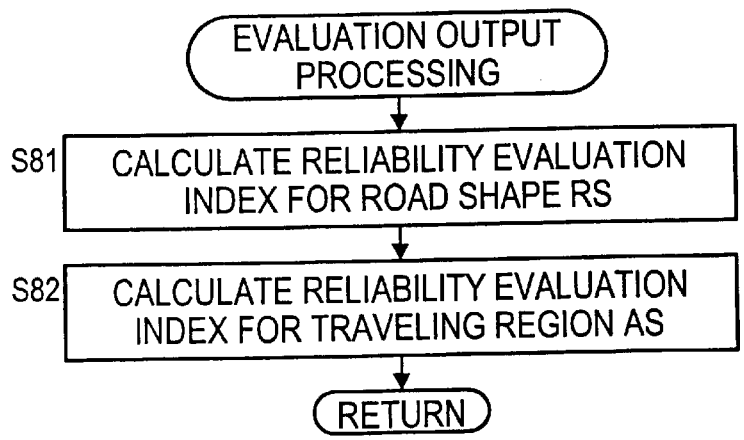
FIG. 8 is a flowchart showing a content of evaluation output process of the exemplary embodiment above shown in FIG. 1.

FIG. 8 is a flowchart for showing the content of the evaluation output processing.

The navigation processor 11 sums the reliability evaluation indices of individual evaluation items for road shape, and calculates a reliability evaluation index for road shape RS in the evaluation output processing (Step 81).

The navigation processor 11 also sums the reliability evaluation indices of individual evaluation items for the traveling region, and calculates a reliability evaluation index for the traveling region AS in the evaluation output processing (Step 82), and returns.

The order of Step 81 and Step 82 is arbitrary in this exemplary evaluation output processing shown in FIG. 8. It is possible to inverse the processing order shown in FIG. 8, or both processes shown in FIG. 8 may be processed in parallel.

Figure 9:
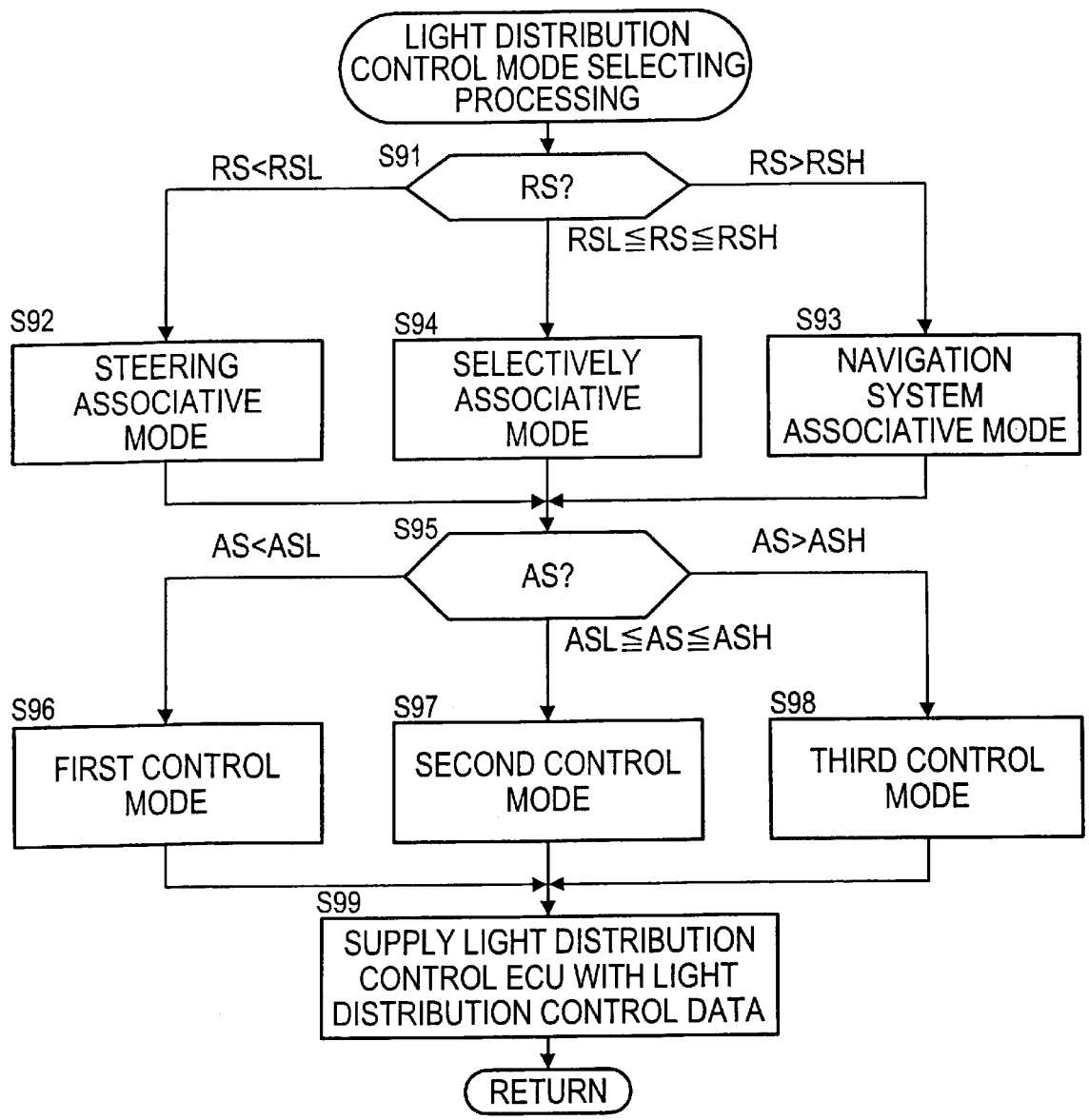
FIG. 9 is a flowchart showing a content of light distribution control mode selecting process of the exemplary embodiment shown in FIG. 1.

FIG. 9 is a flowchart for showing the content of light distribution control mode selecting processing.

The navigation processor 11 makes a decision based on the reliability evaluation index for the road shape RS (Step 91).

When the reliability evaluation index for the road shape RS is lower than a predetermined reference value RSL (RSL=0, for example) (RS<RSL, including a failure), the navigation processor 11 adopts the steering associative mode (Step 92), and decides the light distribution angle θ hs decided from the steering sensor 134 in Step 13 of FIG. 7.

When the reliability evaluation index for road shape RS is larger than another reference value RSH (RSH>RSL) (RSH<RS), the navigation processor 11 adopts the navigation system associative mode (Step 93), and decides the light distribution angle θ hn decided from the road shape detected in Step 13 in FIG. 7. 70% of a summation of the positive evaluation points in the reliability determining table 123 is set as the reference value RSH while the summation is set to 100.

When the reliability evaluation index for road shape RS is equal to or more than the reference value RSL, and is equal to or less than the reference value RSH (RSL≦RS≧RSH), the navigation processor 11 adopts the selectively associative mode (Step 94), and decides the light distribution angle θ hs or θ hn corresponding to a selected associative mode (steering associative mode or navigation system associative mode).

The selectively associative mode (Step 94) is a mode where the steering associative mode is main, the navigation system associative mode is selectively adopted, and the navigation system associative mode is selected when a steering angle more than a predetermined angle is detected, for example.

Then, the navigation processor 11 makes a decision on the reliability evaluation index for the traveling region AS (Step 95).

When the reliability evaluation index for the traveling region AS is lower than a predetermined reference value ASL (AS<ASL, including a failure), the navigation processor 11 adopts a first control mode (Step 96), and decides 0 as the light distribution pattern number, and medium as the glare quantity.

When the reliability evaluation index for the traveling region AS is equal to or more than the reference value ASL, and is equal to or less than the other reference value ASH (ASL<ASH) (ASL≦AS≧ASH), the navigation processor 11 adopts the second control mode (Step 97), and decides 0, 1, or 2 as the light distribution pattern number corresponding to the traveling region determined in Step 13, and decides a glare quantity one step lower than the glare quantity set corresponding to the individual light distribution pattern numbers in the reliability determining table 123.

When the reliability evaluation index for the traveling region AS is equal to or larger than the reference value RSH (ASH<AS), the navigation processor 11 selects a third control mode (Step 98), and decides 0, 1, or 2 as the light distribution pattern number corresponding to the traveling region determined in Step 13, and decides a corresponding glare quantity.

Though any one of the first control mode to the third control mode is selected according to the value of the reliability evaluation index for the traveling region AS in this embodiment, the navigation processor 11 may decide 3 as the light distribution pattern number and low as the glare quantity as dedicated for an intersection in an urban region when it is detected that the current vehicle-position reaches a point 50 m before an intersection during traveling in an urban region.

The navigation processor 11 supplies the light distribution control ECU 40 with the light distribution pattern number, the glare amount, and the light distribution angle θ h (θ hs or θ hn) decided as above as the light distribution control data (Step 99), and then exits from the processing as shown in FIG. 9.

The light distribution control ECU 40 controls the headlamps A, the movable reflectors B, the bending lamps C, the beams for high speed traveling D according to the light distribution control data supplied from the navigation processor 11, thereby conducting a proper light distribution control for the traveling area and region.

Because the light distribution control data provided for light distribution control ECU 40 reflect the determined results of the reliabilities of a road shape and a traveling region, it is possible to conduct a light distribution with a proper area and glare quantity according to the determined reliabilities.

The following section describes a second exemplary embodiment of the invention.

Though the evaluation indices for individual items prescribed in the reliability determining table in FIG. 2 are used to calculate the individual evaluation indices RS and AS for the reliability of road shape, and the reliability of traveling region in the first exemplary embodiment, other items are included as subjects to the evaluation in the second exemplary embodiment.

Namely, the reliability of the matching means, the reliability of the map database, and whether the traveling road is a guiding path or not are determined as well in the second exemplary embodiment.

The configuration and operation of the light distribution control apparatus of the second exemplary embodiment are the same as those of the first exemplary embodiment described above, except for the reliability determining processing (Step 14) of the light distribution control processing (FIG. 7).

Figure 10:
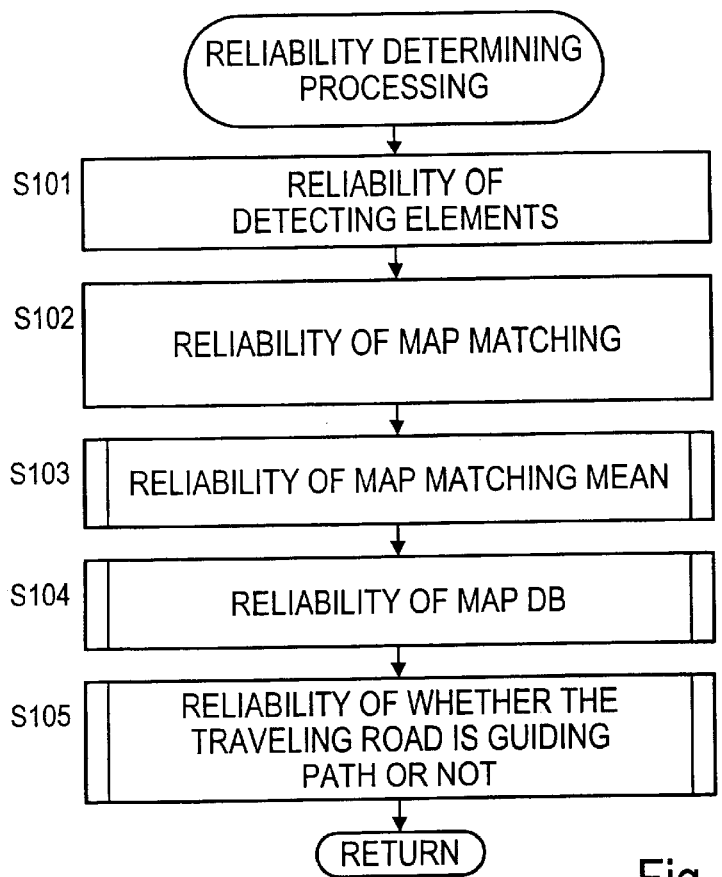
FIG. 10 is a flowchart showing a processing operation of the reliability determining process of a second exemplary embodiment.

FIG. 10 is a flowchart for showing a processing operation of the reliability determining process of the second exemplary embodiment 2.

The navigation processor 11 calculates the reliability evaluation index for the road shape, and the reliability evaluation index for the traveling region for the individual detecting element items (Step 101) (such as a GPS receiver, a gyro sensor, and a distance sensor) following the reliability evaluating table 123 shown in FIG. 2 and as shown in FIG. 10.

The navigation processor 11 calculates the reliability evaluation index for the road shape, and the reliability evaluation index for the traveling region for the individual items relating to the map matching (Step 102).

The processing in Step 101 and Step 102 of FIG. 10 is the same as that in the first exemplary embodiment.

Then, the navigation processor 11 determines the reliability of the map matching means (Step 103).

Then the navigation processor 11 determines the reliability of the map database (Step 104).

Then the navigation processor 11, determines the reliability of the traveling road as a guiding path or not (Step 105).

Figure 11:
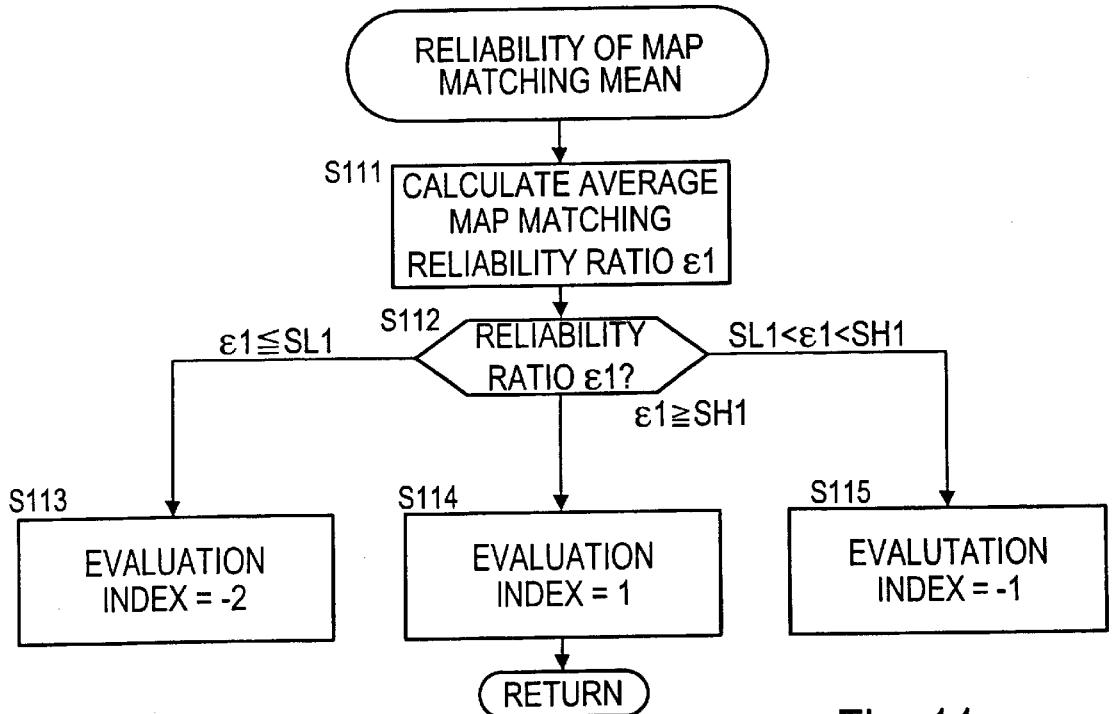
FIG. 11 is a flowchart showing reliability determining processing of a matching means of the second exemplary embodiment shown in FIG. 10.

FIG. 11 is a flowchart for showing a sub-routine for the reliability determining processing of the map matching means of Step 103 of FIG. 10.

The navigation processor 11 calculates the map matching average reliability ratio ε1 (Step 111) from the data obtained in the navigation base processing as in Step 11 (FIG. 7) and as shown in FIG. 11.

The reliability ratio ε1 is a value obtained by dividing a distance ΔDi between a current vehicle position PGi (X, Y, (Z)) calculated from the GPS data, and a current vehicle position PMi (X, Y, (Z)) on a traveling path after the map matching by a map matching allowable (target) error δ, or an average value of it for a predetermined period or a predetermined traveling distance.

The reliability ratio ε1 is calculated with the following equations (1) and (2):

$$\epsilon = \Sigma(\Delta Di)/(\delta \times n)(\text{range of } \Sigma \text{ is } i=1 \text{ to } n) \quad (1)$$

$$\Delta Di = (\sqrt{(PGi(X,Y,(Z)))^2 + PMi(X,Y,(Z))^2})/\delta \quad (2)$$

PGi (X, Y, (Z)) represents the current vehicle position calculated from the GPS data.

PMi (X, Y, (Z)) represents the current vehicle position on a traveling path after the map matching.

δ represents the allowable error for map matching.

ΔDi is the map matching error and the distance between PGi (X, Y, (Z)) and PMi (X, Y, (Z)).

δ may be a function of the vehicle speed or the type of traveling road and is set larger for expressway travel than for urban region travel.

Then, the navigation processor 11 compares the reliability ratio ε1 with a predetermined reference value SL1 and the other reference value SH1 (SH1>SL1) (Step 112).

The navigation processor 11 sets the reliability evaluation index of the matching means to −2 (Step 113) when the reliability ratio ε1 is equal to or less than the reference value SL1 and then returns for repeat processing.

The navigation processor 11 sets the reliability evaluation index of the matching means to 1 (Step 114) when the reliability ratio ε1 is equal to or more than the reference value SH1 and then returns for repeat processing.

The navigation processor 11 sets the reliability evaluation index of the matching means to −1 (Step 115) when the reliability ratio ε1 is more than the reference value SL1, and less than the reference value SH1 and then returns for repeating processing.

Then, the navigation processor 11 determines the reliability of the map database (Step 104, FIG. 10).

Figure 12:
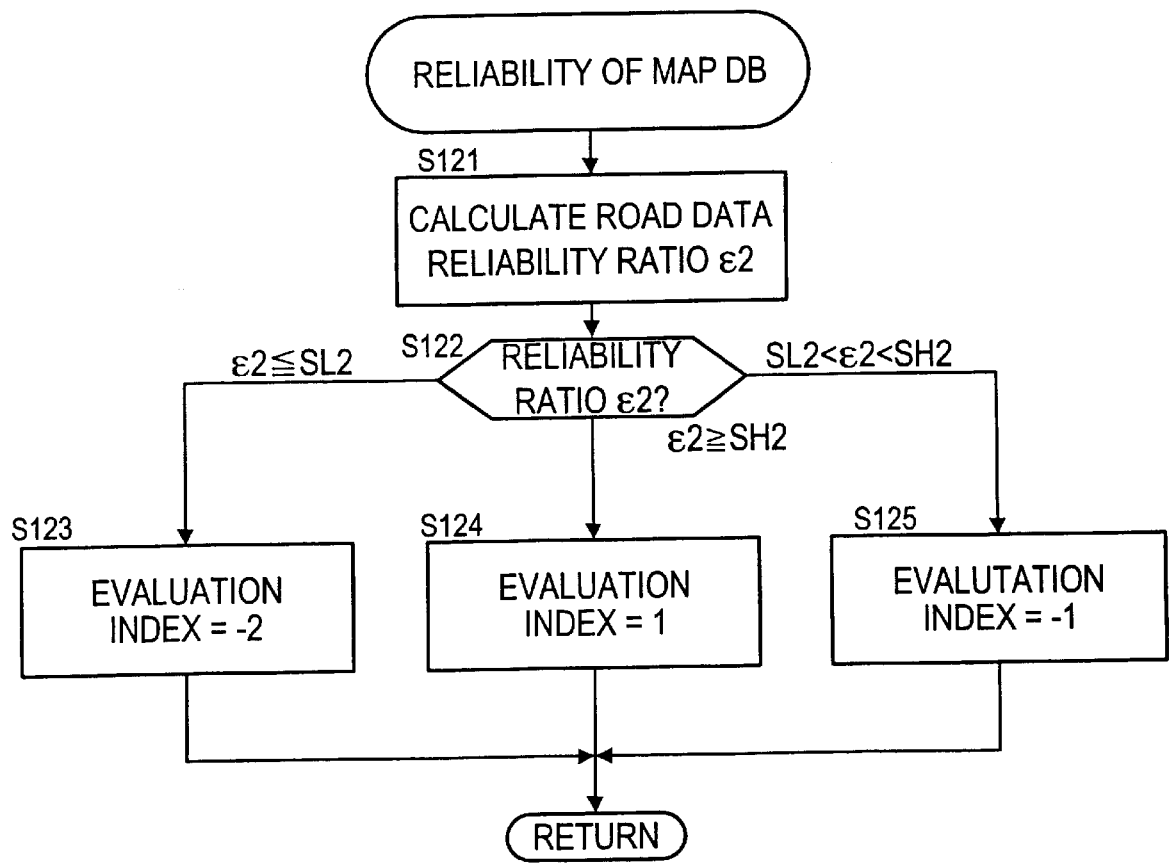
FIG. 12 is a flowchart showing reliability determining processing of a map database of the second exemplary embodiment.

FIG. 12 is a flowchart showing a process for determining the reliability of the map database.

The navigation processor 11 calculates a reliability ratio of the road data ε2 with respect to the road on which the vehicle is traveling (Step 121) from the data obtained by the navigation base processing in Step 11 (FIG. 7) and as shown in FIG. 12.

Namely, the navigation processor 11 obtains a road property of the traveling road subject to the map matching, or the road property and a region property from the map data 120, and obtains the reliability ratio of the road data ε2 from a combination of them in Steps 122–125 of FIG. 12.

FIG. 13 shows a table for setting the reliability ratio ε2 of the road data from the road class (type) property and the region property.

Columns are classified into road classes such as national road, prefectural or county road, and city road, and rows are classified into the region properties such as commercial/industrial, urban, non-urban and underpopulated regions in FIG. 13. The reliability ratios ε2 are assigned to these row/column property characteristics in advance. Values of the reliability ratio ε2 prescribed in this table are obtained by rounding off the least significant bit of product of reliabilities assigned to items in the row and the column.

It is possible to extract the row and column properties relating to the traveling path of a vehicle from the road data, and to multiply the individual values of the reliabilities for these properties for obtaining a final reliability ratio ε2. In this case, though the product is designated as the reliability ratio ε2, the digit of $10^{-2}$ may be rounded off. The result of a rounded one coincides with the value in the table exemplified in FIG. 13.

The table of FIG. 13 is set such that the closer to the left the column is, the higher the class becomes, and the higher the class becomes, the higher the reliability ratio becomes as shown in FIG. 13. The more lanes the road has, the higher class it is assigned to in the same road type.

On the other hand, the reliability is set to underpopulated/mountain region, non-urban region, urban region, and commercial/industrial region in ascending order according to the type of region property.

FIG. 14 shows another table for determining the reliability ratio ε2 of road data. The table in FIG. 14 may be used in place of the table in FIG. 13 for the reliability ratio ε2.

In FIG. 14 columns are classified by the road class property as in FIG. 13, and rows are classified by altitude H. The reliability ratios ε2 of FIG. 14 are thus set to the combinations of the columns and rows in advance. FIG. 14 is set such that the higher the altitude becomes, the lower the reliability becomes, and the lower the altitude becomes, the higher the reliability becomes.

Though the previous section describes cases where the reliability ratio of road data ε2 is decided from the combination of road class and region or the combination of road class and altitude, it is possible to set the reliability ratios of road data ε2 for a combination of the three elements comprising the road class, the region, and the altitude in advance, and to decide from the three elements.

Then, the navigation processor 11 compares the calculated reliability ratio ε2 with a predetermined reference value SL2, and the other reference value SH2 (SH2>SL2) (Step 122) of FIG. 12.

The navigation processor 11 sets the reliability evaluation index of matching means to −2 when the reliability ratio ε2 is equal to or less than the reference value SL2 (Step 123) in FIG. 12, and returns for repeat processing.

The navigation processor 11 sets the reliability evaluation index of matching means to 1 when the reliability ratio ε2 is equal to or more than the reference value SH2 (Step 124) in FIG. 12, and returns for repeat processing.

The navigation processor 11 sets the reliability evaluation index of matching means to −1 when the reliability ratio ε2 is more than the reference value SL2, and less than the reference value SH2 (Step 125) in FIG. 12, and returns for repeating processing.

After the reliability of the map database has been determined via steps 121–125 of FIG. 12, then, the navigation processor 11 determines whether the traveling road is a guiding path or not (Step 105, FIG. 10).

Figure 15:
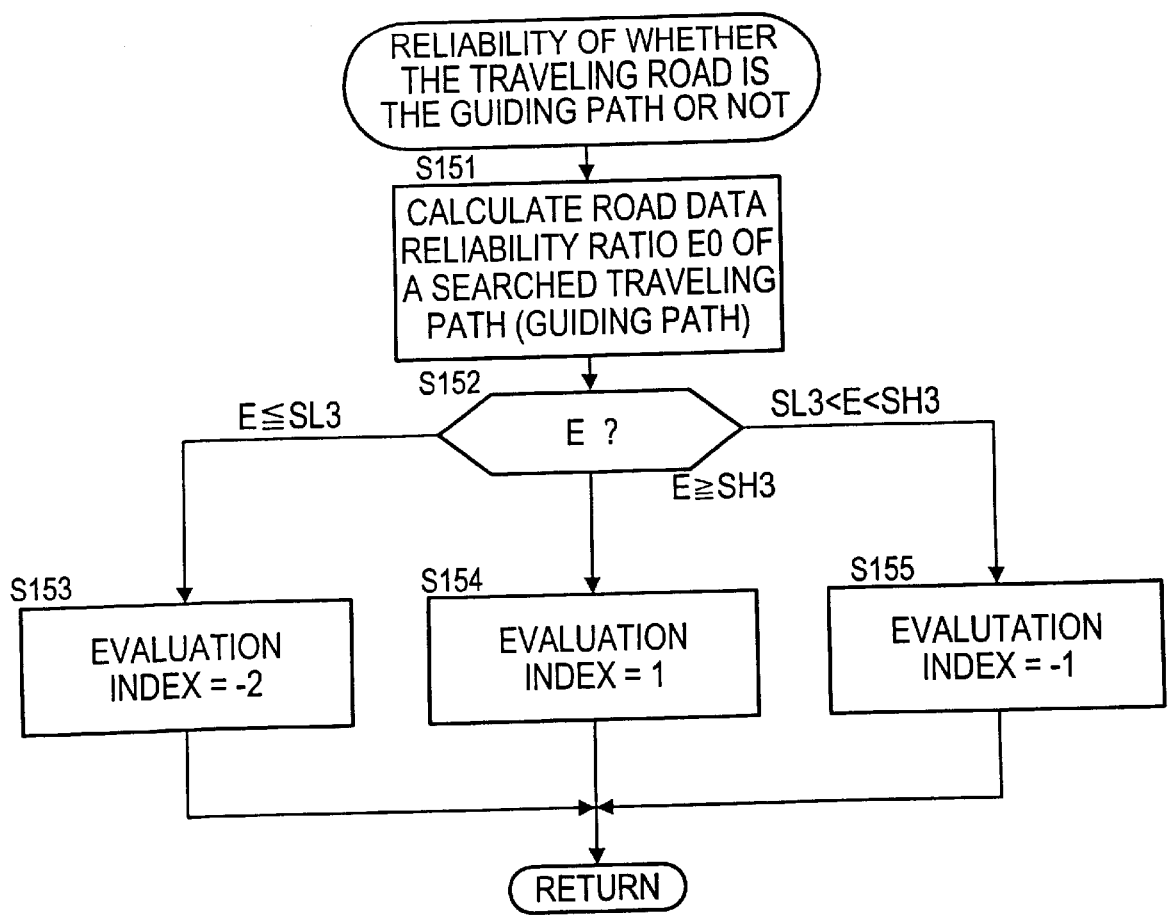
FIG. 15 illustrates reliability determining processing of whether a traveling road is a guiding path or not of the second exemplary embodiment.

FIG. 15 is a flowchart for showing a reliability determining process for determining whether the road is a guiding path or not.

The navigation processor 11 calculates a reliability EO relating to whether the vehicle is traveling on the traveling path (guiding path) (Step 151) obtained by the path search from the data obtained by the navigation base processing in Step 11 (FIG. 7) and as shown in FIG. 15.

The reliability ratio of the current vehicle position ε3, or a reliability for traveling on the guiding path ψ is used for the reliability E of guiding path. Both reliabilities are calculated with the following equations (3), (4), and (5):

$$\psi=\Sigma(\epsilon i)/(\delta \times n)(\text{range of } \Sigma \text{ is } i=1 \text{ to } n) \quad (3)$$

$$\epsilon i=\Delta Di/\delta \quad (4)$$

$$\Delta Di=\sqrt{(PGi(X,Y,(Z))^2+PMi(X,Y,(Z))^2)} \quad (5)$$

PGi (X, Y, (Z)) represents the current vehicle position calculated from the GPS data.

PMi (X, Y, (Z)) represents the current vehicle position on a traveling road after the map matching.

δ represents the allowable error for the map matching.

ΔDi is the map matching error, and is the distance between PGi (X, Y, (Z)) and PMi (X, Y, (Z)).

δ may be a function of the vehicle speed or the type of the traveling road. δ is set larger for expressway travel than for urban are a travel.

Then, the navigation processor 11 compares the reliability E with a predetermined reference value SL3 and the other reference value SH3 (SH3>SL3) (Step 152).

The navigation processor 11 sets the reliability evaluation index of matching means to −2 when the reliability E is equal to or less than the reference value SL3 (Step 153), and returns.

The navigation processor 11 sets the reliability evaluation index of matching means to 1 when the reliability E is equal to or more than the reference value SH3 (Step 154), and returns.

The navigation processor 11 sets the reliability evaluation index of matching means to −1 when the reliability E is more than the reference value SL3, and less than the reference value SH3 (Step 155), and returns.

The navigation processor 11 calculates the reliability evaluation index for road shape RS, and the reliability evaluation index for traveling region AS from the individual evaluation indices as obtained in Step 101 to Step 105 in an evaluation output processing.

Then, the navigation processor 11 conducts the light distribution control mode selecting processing (Step 16), and returns to a main routine as in the first exemplary embodiment.

Though the reliability determining processing in the second exemplary embodiment describes a case where the navigation processor 11 calculates the evaluation indices in the order of Step 101 to Step 105, the order is arbitrary, and it is possible to calculate the evaluation indices in another order, and the individual steps may be processed in parallel.

Though the second exemplary embodiment uses the evaluation indices calculated in the individual processes of Step 103 to Step 105 for the evaluation output processing, the light distribution control mode may be selected based on any one of the reliabilities comprising the reliability of the matching means (Step 103), the reliability of the map data base (Step 104), and the reliability of whether the traveling road is the guiding path or not (Step 105).

In this case, the navigation processor 11 selects the steering associative mode and the first control mode when the evaluation index calculated from the individual processing is −2, selects the navigation system associative mode and the third control mode when the evaluation index is 1, and selects the selectively associative mode and the second control mode when the evaluation index is −1.

It is also possible to use any two or the all of these three reliabilities, and to select the light distribution control mode from the sum of the evaluation indices.

The following section describes the third exemplary embodiment.

The items used for determining the reliability of the road shape, the items used for determining the reliability of the traveling region, and the items used for the combination of them are determined for the evaluation indices for the matching means, the evaluation indices for the map data base (road data), the evaluation indices for whether the traveling road is the guiding path or not in addition to the evaluation indices for individual detecting items, and the evaluation indices for individual items relating to the map matching in the first and second exemplary embodiments.

On the other hand, the values of reliability evaluation indices for individual items are divided into that for the reliability of the road shape, and that for the reliability of the traveling region at predetermined ratios in the third exemplary embodiment.

FIG. 16 shows a reliability determining table of the third exemplary embodiment. The items for calculating the reliability evaluation indices (line items) are the same as those in the second exemplary embodiment.

Ratios used for the road shape reliability are under a column item "For RS", and ratios used for the traveling region reliability are under a column item "For AS" for the evaluation indices for these individual items (values in the column item "YES").

For example, the ratio for evaluation index used for the road shape reliability is 100%, and the ratio for the evaluation index used for the traveling region reliability is 0 when the GPS receives radio waves from four or more satellites, and the vehicle travels a predetermined distance/for a predetermined period while conducting a 3D positioning. The ratio for the evaluation index used for the road shape reliability is 50%, and the ratio for the evaluation index used for the traveling region reliability is 50% when the D-GPS information is received.

In the same way, the application ratios applied to RS and to AS for the individual items are in the reliability determining table.

Though the application ratios used for RS and for AS are prescribed as the content of the reliability determining table, they may be prescribed an independent table (application ratio table) as well.

The previous section describes individual exemplary embodiments of the light distribution control apparatus of the invention. The invention is not limited to the described exemplary embodiments, however, and different modifications are possible.

For example, the case where the movable reflector B is rotated to the left and the right corresponding to the light distribution angle θ h, a part of the light distribution is moved to the left and the right, and the light distribution area is extended is possible as described in the exemplary embodiments herein.

On the other hand, providing a rotating mechanism for rotating the entire fixed reflector 4 in FIG. 5 corresponding to the light distribution angle θ h (θ hs, θ hn) may move the entire light distribution area for a straight path to a left and right path. This can guide the visual line of a driver to a more appropriate position.

With the invention, since reliabilities of deciding a road shape and a traveling region are determined, and content of light distribution control is changed according to the determined result, there is less effect from a navigation function, especially detection errors by sensor elements, and a more proper light distribution is enabled.

With at least one form of the invention, because reliabilities of determining a road shape and a traveling region are determined, and the content of light distribution control is changed according to the determined result, an error for detecting a road shape, and an error in road data relating to a traveling region are considered, and a more proper light distribution is enabled.

With at least one form of the invention, because reliabilities of detecting elements (sensors) for a navigation function and map matching are determined, and the reliability of road shape is determined according to the determined result, errors of the navigation function, especially detection errors of the sensor elements, or an error of the map matching is considered, and a more proper light distribution is enabled.

With at least one form of the invention, because a reliability of determining a road shape is determined, a navigation system associative mode where an illuminating angle of a lighting apparatus is changed according to a road shape to the front of or forward of a vehicle is adopted when the reliability is high, and a steering associative mode where the illumination angle of the lighting apparatus is changed according to an operation quantity of a steering wheel is adopted when the reliability is not so high, an error for detecting a road shape, and an error in road data are considered, the navigation system associative mode is properly used only when the reliability is high or medium, and the light distribution based on the actual steering operation quantity is conducted when the reliability is low.

With at least one form of the invention, because a reliability of determining a traveling region is determined, and an illuminated area and a glare quantity are controlled according to the determined result, a detection error of the traveling region, and an error in road data are considered to adjust the glare quantity for controlling lighting, and exerting the glare on other vehicles and pedestrians are prevented.

With at least one form of the invention, because reliabilities of detecting elements (sensors) for a navigation function, and map matching are determined, and a reliability of a traveling region is determined according to the determined result, errors of the navigation function, especially detection errors of the sensor elements, or an error of the map matching is considered, and a more proper light distribution is enabled.

With at least one form of the invention, because a reliability of determining the traveling region is determined, and an illuminated area and a glare quantity are controlled according to the determined result, a detection error of the traveling region, and an error in the road data are considered to adjust the glare quantity for controlling lighting, and exerting the glare on other vehicles and pedestrians are prevented.

With at least one form of the invention, because reliabilities of detecting elements (sensors) for a navigation function and map matching are determined, and the content of light distribution control is changed according to the determined result, errors of the navigation function, especially the detection errors of sensor elements, or an error of the map matching is considered, and a more proper light distribution is enabled.

With at least one form of the invention, because a reliability of map data stored in a map information storing means, and the content of light distribution control is changed according to the determined result, a detection error of road data is considered, and a more proper light distribution is enabled.

With at least one form of the invention, because road data stored in a map information storing means are classified by road property and region property in advance, the road property and the region are considered, and a more precise and proper light distribution is enabled.

With at least one form of the invention, because road property is classified by road width and road type, the classification of road property is considered, and a more precise and proper light distribution is enabled.

With at least one form of the invention, because road data is classified by region property in advance, the classification of region property is considered, and a more precise and proper light distribution is enabled.

With at least one form of the invention, because whether a vehicle position travels on a guiding path to a destination or not is determined, a detection error of whether the vehicle is traveling on the guiding path or not is considered, and a more proper light distribution is enabled.

With at least one form of the invention, whether a parallel road in parallel with a road on which a vehicle is traveling exists or not is considered, and a more proper light distribution is enabled.

While the above described exemplary embodiments are provided, it is understood that one reasonably skilled in the art would know and understand how to make and use various modification of the invention on the basis of the description provided herein, all of which variations, and modification are within the breadth and scope of the claimed invention.

What is claimed is:

1. A light distribution control apparatus comprising:
a lighting apparatus for illuminating forward of a vehicle;
a current position detecting means for detecting a current position of the vehicle;
a map information storing means for storing at least road data for representing road shapes;
a road shape acquiring means for acquiring a road shape forward of the current position detected by the current position detecting means from the road data;
a road shape reliability determining means for determining a reliability of the road shape acquired by the road shape acquiring means; and
a lighting control means for controlling a lighting state of the lighting apparatus based on the road shape acquired by the road shape acquiring means, and a determined result by the road shape reliability determining means.

2. A light distribution control apparatus comprising:
a lighting apparatus for illuminating forward of a vehicle;
a current position detecting means for detecting a current position of the vehicle;
a map information storing means for storing at least road data for representing road shapes;
a map matching means for calculating a road on which the vehicle is traveling with a high probability based on the road data, and for calculating a position on the road based on the detected current position;
a reliability determining means for determining at least either one of a reliability of a detection element of the current position detecting means and a reliability of map matching of the map matching means;
a road shape acquiring means for acquiring a road shape forward of the current position detected by the current position detecting means from the road data;
a road shape reliability determining means for determining a reliability of the road shape acquired by the road shape acquiring means based on the reliability of the detection element, and the reliability of map matching determined by the reliability determining means; and
a lighting control means for controlling a lighting state of the lighting apparatus based on the road shape acquired by the road shape acquiring means and a determined result by the road shape reliability determining means.

3. The light distribution control apparatus according to claim 1 further comprising:
a steering angle detecting means for detecting a steering angle of the vehicle, wherein the lighting control means adopts a steering associative mode where an illuminating angle by the lighting apparatus changes according to the detected steering angle when the reliability determined by the road shape reliability determining means is low, a navigation system associative mode where the illuminating angle by the lighting apparatus changes according to the acquired road shape when the determined reliability is high, and a selectively associative mode where the steering associative mode is mainly adopted, and the navigation system associative mode is selectively adopted when the determined reliability is medium.

4. The light distribution control apparatus according to claim 2 further comprising:
a steering angle detecting means for detecting a steering angle of the vehicle, wherein the lighting control means adopts a steering associative mode where an illuminating angle by the lighting apparatus changes according to the detected steering angle when the reliability determined by the road shape reliability determining means is low, a navigation system associative mode where the illuminating angle by the lighting apparatus changes according to the acquired road shape when the determined reliability is high, and a selectively associative mode where the steering associative mode is mainly adopted, and the navigation system associative mode is selectively adopted when the determined reliability is medium.

5. A light distribution control apparatus comprising:
a lighting apparatus for illuminating forward of a vehicle;
a current position detecting means for detecting a current position of the vehicle;
a map information storing means for storing map information including at least road data for representing road shapes;
a traveling region discriminating means for using the map information to discriminate a traveling region where the vehicle is currently traveling;
a traveling region reliability determining means for determining a reliability of the traveling region acquired by the traveling region discriminating means; and
a lighting control means for controlling an illuminated area and a glare quantity by the lighting apparatus based on the traveling region acquired by the traveling region discriminating means, and a determined result by the traveling region reliability determining means.

6. A light distribution control apparatus comprising:
a lighting apparatus for illuminating forward of a vehicle;
a current position detecting means for detecting a current position of the vehicle;
a map information storing means for storing at least road data for representing road shapes;
a map matching means for calculating a road on which the vehicle is traveling with a high probability based on the road data, and for calculating a position on the road based on the detected current position;
a reliability determining means for determining at least either one of a reliability of a detection element of the current position detecting means, and a reliability of map matching of the map matching means;
a traveling legion discriminating mean for using the map information to discriminate a traveling region where the vehicle is currently traveling;
a traveling region reliability determining means for determining a reliability of the determined traveling region based on the reliability of the detection element and the reliability of map matching determined by the reliability the determining means; and
a lighting control means for controlling a lighting state of the lighting apparatus based on the traveling region discriminated by the traveling region discriminating means and a determined result by the traveling region reliability determining means.

7. The light distribution control apparatus according to claim 5, wherein the lighting control means determines an illuminated area with a high glare quantity corresponding to highways, a base illuminated area with a medium glare quantity corresponding to non-highway suburban traveling regions, or an illuminated area with a low glare quantity corresponding to urban regions according to the discriminated traveling region, adopts the base illuminated area when the determined reliability of the determined traveling region is low regardless of the determined traveling region, decreases the glare quantity in an illuminated area corresponding to the determined traveling region when the determined reliability of the determined traveling region is medium, and selects an illuminated area corresponding to the determined traveling region when the determined reliability of the determined traveling region is high.

8. The light distribution control apparatus according to claim 6, wherein the lighting control means determines an illuminated area with a high glare quantity corresponding to highways, a base illuminated area with a medium glare quantity corresponding to non-highway suburban traveling regions, or an illuminated area with a low glare quantity corresponding to urban regions according to the discriminated traveling region, adopts the base illuminated area when the determined reliability of the determined traveling region is low regardless of the determined traveling region, decreases the glare quantity in an illuminated area corresponding to the determined traveling region when the determined reliability of the determined traveling region is medium, and selects an illuminated area corresponding to the determined traveling region when the determined reliability of the determined traveling region is high.

9. A light distribution control apparatus comprising:
a lighting apparatus for illuminating forward of a vehicle;
a current position detecting means for detecting a current position of the vehicle;
a map information storing means for storing at least road data for representing road shapes;
a matching means for calculating a road on which the vehicle is traveling with a high probability based on the road data, and for calculating a position on the road based on the detected current position;
a reliability determining means for determining at least either one of a reliability of a detection element of the current position detecting means and a reliability of the matching means; and
a lighting control means for controlling a lighting state of the lighting apparatus based on a determined result by the reliability determining means.

10. A light distribution control apparatus comprising:
a lighting apparatus for illuminating forward of a vehicle;
a current position detecting means for detecting a current position of the vehicle;
a map information storing means for storing at least road data for representing road shapes;
a road data reliability determining means for determining a reliability of the road data corresponding to the detected current position; and
a lighting control means for controlling a lighting state of the lighting apparatus based on a determined result by the road data reliability determining means.

11. The light distribution control apparatus according to claim 10 further comprising:
a road property judging means for judging a road property of a road on which the vehicle is traveling based on the road data; and
a region property judging means for judging a region property of a region in which the vehicle is traveling based on the road data;
wherein the road data reliability determining means determines the reliability of the road data based on either one of the road property and the region property.

12. The light distribution control apparatus according to claim 11, wherein the road data is classified by at least either one of road width and road type as the road property in advance.

13. The light distribution control apparatus according to claim 11, wherein the road data is classified into at least either one of an urban region, a non-urban region, an underpopulated region, a metropolitan region, a flatland region and a mountain region as the region property in advance.

14. A light distribution control apparatus comprising:

a lighting apparatus for illuminating forward of a vehicle;

a current position detecting means for detecting a current position of the vehicle;

a map information storing means for storing at least road data for representing road shapes;

a path searching means for searching for a traveling path to a destination;

an on-guiding path reliability determining means for determining a reliability that the detected current position of the vehicle is on the searched traveling path; and a lighting control means for controlling a lighting state of the lighting apparatus based on a determined result by the on-guiding path reliability determining means.

15. The light distribution control apparatus according to claim 2 wherein the reliability determining means determines the reliability while considering whether there is a road above, below, left of, or right of, and parallel to the road on which the vehicle is traveling with a high probability.

16. The light distribution control apparatus according to claim 6 wherein the reliability determining means determines the reliability while considering whether there is a road above, below, left of, or right of, and parallel to the road on which the vehicle is traveling with a high probability.

17. A method for controlling light distribution in a traveling direction of a vehicle, comprising:

determining a current position of a vehicle;

determining a traveling region;

determining a reliability factor of a traveling path in the traveling region;

illuminating the traveling path in the traveling direction forward of the vehicle according to a changing shape, contour or direction of the traveling path and the reliability factor of the traveling path relative to the vehicle by changing the angle, intensity or direction of light from a headlamp of the vehicle.

18. The method of claim 17, wherein the traveling region is one of a highway, a suburban road or an urban road.

19. The method of claim 18, wherein an illuminated area and a glare quantity from the headlamps of the vehicle are further controlled according to the traveling region.

* * * * *

UNITED STATES PATENT AND TRADEMARK OFFICE
CERTIFICATE OF CORRECTION

PATENT NO.    : 6,609,817 B2
DATED         : August 26, 2003
INVENTOR(S)   : Toshiaki Niwa et al.

It is certified that error appears in the above-identified patent and that said Letters Patent is hereby corrected as shown below:

<u>Title page,</u>
Item [75], should read:
-- [75] Inventors: Toshiaki Niwa, Okazaki (JP); Toshihiro Shiimado, Okazaki (JP); Shoji Kobayashi, Shimizu (JP); Kazuhiro Suzuki, Shimizu (JP) --

Signed and Sealed this

Twenty-third Day of December, 2003

JAMES E. ROGAN
*Director of the United States Patent and Trademark Office*